(12) United States Patent
Sasaki et al.

(10) Patent No.: US 7,336,442 B2
(45) Date of Patent: Feb. 26, 2008

(54) MAGNETIC HEAD AND METHOD OF MANUFACTURING SAME, AND MAGNETIC HEAD SUBSTRUCTURE

(75) Inventors: Yoshitaka Sasaki, Milpitas, CA (US); Hiroyuki Itoh, Milpitas, CA (US); Hironori Araki, Milpitas, CA (US); Kazuo Ishizaki, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 347 days.

(21) Appl. No.: 11/207,891

(22) Filed: Aug. 22, 2005

(65) Prior Publication Data

US 2007/0041126 A1 Feb. 22, 2007

(51) Int. Cl.
 *G11B 5/147* (2006.01)
(52) U.S. Cl. .................................... 360/126
(58) Field of Classification Search ................ 360/121, 360/125, 126
 See application file for complete search history.

(56) References Cited

U.S. PATENT DOCUMENTS

| | | | |
|---|---|---|---|
| 4,656,546 A | 4/1987 | Mallory | |
| 5,742,995 A | 4/1998 | Amin et al. | |
| 6,459,543 B1 * | 10/2002 | Sasaki | 360/126 |
| 6,504,675 B1 | 1/2003 | Shukh et al. | |
| 2003/0151850 A1 | 8/2003 | Nakamura et al. | |
| 2006/0139802 A1 * | 6/2006 | Sasaki et al. | 360/126 |

FOREIGN PATENT DOCUMENTS

JP A 2003-242607 8/2003

* cited by examiner

*Primary Examiner*—Allen Cao
(74) *Attorney, Agent, or Firm*—Oliff & Berridge, PLC

(57) ABSTRACT

A method of manufacturing magnetic heads comprises the steps of: fabricating a magnetic head substructure by forming components of a plurality of magnetic heads on a single substrate so that a plurality of rows of pre-head portions that will be the respective magnetic heads later are aligned in the substructure; and fabricating the magnetic heads by separating the pre-head portions from one another through cutting the substructure. Indicator sections are formed in the substructure. The indicator sections include first indicators and second indicators. Widths of the first and second indicators are equal in an imaginary surface indicating a target location of the medium facing surfaces. One of the widths of the first and second indicators decreases while the other increases with shifts in position along the direction orthogonal to the medium facing surfaces.

43 Claims, 26 Drawing Sheets

MAGNETIC HEAD AND METHOD OF MANUFACTURING SAME, AND MAGNETIC HEAD SUBSTRUCTURE

BACKGROUND OF THE INVENTION

1. Field of the Invention

The present invention relates to magnetic heads used for writing data on a recording medium and a method of manufacturing the magnetic heads, and to a magnetic head substructure used for manufacturing the magnetic heads.

2. Description of the Related Art

The recording systems of magnetic read/write devices include a longitudinal magnetic recording system wherein signals are magnetized in the direction along the surface of the recording medium (the longitudinal direction) and a perpendicular magnetic recording system wherein signals are magnetized in the direction perpendicular to the surface of the recording medium. It is known that the perpendicular magnetic recording system is harder to be affected by thermal fluctuation of the recording medium and capable of implementing higher linear recording density, compared with the longitudinal magnetic recording system.

In each of the longitudinal magnetic recording system and the perpendicular magnetic recording system, magnetic heads typically used have a structure in which a reproducing (read) head having a magnetoresistive element (that may be hereinafter called an MR element) for reading and a recording (write) head having an induction-type electromagnetic transducer for writing are stacked on a substrate.

In each of the longitudinal and perpendicular magnetic recording systems, the write head comprises a coil for generating a magnetic field corresponding to data to be written on a recording medium, and a magnetic pole layer for allowing a magnetic flux corresponding to the field generated by the coil to pass therethrough and generating a write magnetic field for writing the data on the recording medium. The pole layer incorporates a track width defining portion and a wide portion, for example. The track width defining portion has an end located in a medium facing surface that faces toward the recording medium. The wide portion is coupled to the other end of the track width defining portion and has a width greater than the width of the track width defining portion. The track width defining portion has a nearly uniform width.

To achieve higher recording density, it is a reduction in track width, that is, a reduction in width of the end face of the pole layer taken in the medium facing surface, and an improvement in writing characteristics that is required for the write head. An improvement in writing characteristics is, for example, an improvement in overwrite property that is a parameter indicating an overwriting capability. The overwrite property becomes poorer if the track width is reduced. It is therefore required to achieve a better overwrite property as the track width is reduced. Here, the length of the track width defining portion taken in the direction orthogonal to the medium facing surface is called a neck height. The smaller the neck height, the better is the overwrite property.

A magnetic head used for a magnetic disk drive such as a hard disk drive is typically provided in a slider. The slider has the above-mentioned medium facing surface. The medium facing surface has an air-inflow-side end and an air-outflow-side end. The slider slightly flies over the surface of the recording medium by means of the airflow that comes from the air-inflow-side end into the space between the medium facing surface and the recording medium. The magnetic head is typically disposed near the air-outflow-side end of the medium facing surface of the slider. In a magnetic disk drive the magnetic head is aligned through the use of a rotary actuator, for example. In this case, the magnetic head moves over the recording medium along a circular orbit centered on the center of rotation of the rotary actuator. In such a magnetic disk drive, a tilt called a skew of the magnetic head is created with respect to the tangent of the circular track, in accordance with the position of the magnetic head across the tracks.

In a magnetic disk drive of the perpendicular magnetic recording system that exhibits a better capability of writing on a recording medium than the longitudinal magnetic recording system, in particular, if the above-mentioned skew is created, there arise problems, such as a phenomenon in which data stored on an adjacent track is erased when data is written on a specific track (that is hereinafter called adjacent track erasing) or unwanted writing is performed between adjacent two tracks. To achieve higher recording density, it is required to suppress adjacent track erasing. Unwanted writing between adjacent two tracks affects detection of servo signals for alignment of the magnetic head and the signal-to-noise ratio of a read signal.

A technique is known for preventing the problems resulting from the skew as described above, as disclosed in U.S. Patent Application Publication No. US 2003/0151850 A1 and U.S. Pat. No. 6,504,675 B1, for example. According to this technique, the end face of the track width defining portion located in the medium facing surface is made to have a shape in which the side located backward in the direction of travel of the recording medium (that is, the side located closer to the air inflow end of the slider) is shorter than the opposite side. Typically, in the medium facing surface of a magnetic head, the end further from the substrate is located forward in the direction of travel of the recording medium (that is, located closer to the air outflow end of the slider). Therefore, the above-mentioned shape of the end face of the track width defining portion located in the medium facing surface is such a shape that the side closer to the substrate is shorter than the side further from the substrate.

As a magnetic head for the perpendicular magnetic recording system, a magnetic head comprising a pole layer and a shield is known, as disclosed in U.S. Pat. No. 4,656,546, for example. In the medium facing surface of this magnetic head, an end face of the shield is located forward of an end face of the pole layer along the direction of travel of the recording medium with a specific small space. Such a magnetic head will be hereinafter called a shield-type head. In the shield-type head, the shield prevents a magnetic flux from reaching the recording medium, the flux being generated from the end face of the pole layer and extending in directions except the direction perpendicular to the surface of the recording medium. The shield-type head achieves a further improvement in linear recording density.

In the course of manufacturing magnetic heads, a number of magnetic head elements to be the magnetic heads are formed in a single substrate (wafer). The substrate in which the magnetic head elements are formed is cut such that the surface to be the medium facing surfaces appears. This surface is then polished to form the medium facing surfaces.

U.S. Pat. No. 5,742,995 discloses a technique in which a first triangle and a second triangle disposed to be opposite to each other are formed in a wafer and these triangles are used to calculate the height of an MR sensor (that is, the length of the MR sensor taken in the direction orthogonal to the medium facing surface). In this technique, the height of the MR sensor is calculated by using the width of the base of the first triangle in the medium facing surface before the wafer is processed (before the wafer is polished), the width of the top of the second triangle in the medium facing surface before the wafer is processed, the width of the base of the first triangle in the medium facing surface after the wafer is polished, and the width of the top of the second triangle in the medium facing surface after the wafer is polished.

Consideration will now be given to a method of forming a pole layer in which the end face of the track width defining portion located in the medium facing surface has a shape in which the side closer to the substrate is shorter than the side further from the substrate, as previously mentioned. In prior art, frame plating has been often employed as a method of forming such a pole layer. According to the method of forming the pole layer by frame plating, an electrode film is first formed on a layer serving as a base of the pole layer. Next, a photoresist layer is formed on the electrode film. The photoresist layer is then patterned to form a frame having a groove whose shape corresponds to the pole layer. Next, plating is performed by feeding a current to the electrode film to form the pole layer in the groove. The frame is then removed. Next, portions of the electrode film except the portion below the pole layer are removed.

When frame plating is employed, it is difficult to form a groove having a small width in the photoresist layer by photolithography. Therefore, the problem is that it is difficult to reduce the track width when the pole layer is formed by frame plating. To solve this problem, it is possible that, after forming the pole layer by frame plating, both side portions of the track width defining portion are etched by dry etching such as ion beam etching so as to reduce the track width.

FIG. 38 illustrates an example of shape of the top surface of the pole layer when the track width is reduced by etching both side portions of the track width defining portion as described above. FIG. 38 shows a neighborhood of the boundary between a track width defining portion 201 and a wide portion 202 of the pole layer before the medium facing surface is formed. In FIG. 38, 'ABS' indicates an imaginary surface located in a target location of the medium facing surface that is the location at which the medium facing surface is to be formed, 'TW' indicates the track width, and 'NH' indicates the neck height as designed.

When the track width TW is reduced by etching the side portions of the track width defining portion 201, it is likely that the pole layer goes out of a desired shape. As a result, particularly when the neck height NH is small, it is likely that the track width defining portion 201 forms a shape in which the width varies depending on the location along the direction orthogonal to the medium facing surface (the vertical direction in FIG. 38), as shown in FIG. 38.

When the track width defining portion 201 has a shape as shown in FIG. 38, the neck height is strictly the length between the imaginary surface ABS and the point at which the width of the track width defining portion 201 starts to be greater than the width thereof taken in the imaginary surface ABS. However, if the neck height is thus defined, it is difficult to precisely determine the neck height when the track width defining portion 201 has the shape as shown in FIG. 38. Therefore, the neck height is defined as will be described below when the track width defining portion 201 has the shape as shown in FIG. 38. In the top surface of the pole layer, an imaginary straight line L1 passes through the intersection point of the imaginary surface ABS and the side portion of the track width defining portion 201, and extends in the direction orthogonal to the imaginary surface ABS. An imaginary straight line L2 extends from a straight line portion of the side portion of the wide portion 202 connected to the side portion of the portion 201 and extends in the direction in which the straight line portion extends. The intersection point of the imaginary straight lines L1 and L2 is defined as C. The distance between the imaginary surface ABS and the point C is defined as the neck height. The neck height as thus defined is nearly equal to the neck height NH as designed.

When the track width defining portion 201 has the shape as shown in FIG. 38, if the location of the medium facing surface goes out of a desired location and the neck height then goes out of a desired value, there is a possibility that the track width TW is out of a desired value, too.

An example of method of manufacturing magnetic heads will now be described. First, components of a plurality of magnetic heads are formed in a single substrate to fabricate a magnetic head substructure in which a plurality of rows of pre-head portions that will be the magnetic heads later are aligned. Next, the magnetic head substructure is cut to fabricate a head aggregate including a single row of the pre-head portions. Next, a surface formed in the head aggregate by cutting the magnetic head substructure is polished (lapped) to form the medium facing surfaces of the pre-head portions that the head aggregate includes. Next, flying rails are formed in the medium facing surfaces. Next, the head aggregate is cut so that the pre-head portions are separated from one another, and the magnetic heads are thereby formed.

An example of method of forming the medium facing surfaces by lapping the head aggregate will now be described. In the method, the head aggregate is lapped so that the MR heights of a plurality of pre-head portions are made equal while the resistances of a plurality of MR elements that the head aggregate includes are detected. The MR height is the length of each of the MR elements taken in the direction orthogonal to the medium facing surface.

According to the method of forming the medium facing surfaces as described above, it is possible to form the medium facing surfaces so that the MR heights are of a desired value. As a result, according to the method, a portion of each medium facing surface at which an end of the MR element is exposed is placed at a desired location. Furthermore, if the angle formed between the medium facing surface and the top surface of the substrate is 90 degrees, a portion of the medium facing surface at which an end face of the track width defining portion is exposed is placed at a desired location, too. As a result, the neck height is of a desired value, too.

In prior art, however, the angle formed between the medium facing surface and the top surface of the substrate is other than 90 degrees in some cases. This is caused by misalignment of the head aggregate and a jig with respect to each other, the jig supporting the head aggregate when the aggregate is lapped. If the angle formed between the medium facing surface and the top surface of the substrate is other than 90 degrees, the portion of the medium facing surface at which the end face of the track width defining portion is exposed is placed at a location deviating from the desired location even though the portion of the medium facing surface at which the end of the MR element is exposed is placed at the desired location. As a result, the neck height is of a value other than the desired value. In FIG. 38, the range indicated with numeral 203 shows a range of deviation from a desired location of the portion of the medium facing surface at which the end face of the track width defining portion is exposed.

As described above, if the neck height is of a value other than the desired value, the track width is of a value other than the desired value, too. As thus described, in prior art the problem is that there are some cases in which the portion of the medium facing surface at which the end face of the track width defining portion is exposed is placed at a location other than the desired location, and the track width is of a value other than the desired value. As a result, the yield of magnetic heads is reduced.

According to the technique disclosed in U.S. Pat. No. 5,742,995, it is possible to calculate the MR height but it is impossible to solve the above-mentioned problem. In addition, it is impossible to detect the target location of the medium facing surface through this technique. Furthermore, according to this technique, it is required to measure the width of the base of the first triangle and the width of the top of the second triangle in the medium facing surface before the wafer is processed (before the wafer is polished), which results in an increase in the number of steps for manufacturing the magnetic heads.

OBJECT AND SUMMARY OF THE INVENTION

It is an object of the invention to provide a magnetic head and a method of manufacturing the same, and a magnetic head substructure each of which is provided for forming a medium facing surface at a desired location with accuracy.

Each of magnetic heads manufactured by a method of the invention comprises: a medium facing surface that faces toward a recording medium; a coil that generates a magnetic field corresponding to data to be written on the recording medium; and a pole layer that incorporates a track width defining portion having an end face located in the medium facing surface, allows a magnetic flux corresponding to the field generated by the coil to pass therethrough, and generates a write magnetic field for writing the data on the recording medium.

The method of manufacturing the magnetic heads of the invention comprises the steps of: fabricating a magnetic head substructure by forming a plurality of sets of the pole layer and the coil on a substrate so that a plurality of rows of pre-head portions that will be the respective magnetic heads later are aligned in the substructure; and fabricating the magnetic heads by separating the pre-head portions from one another through cutting the substructure. The step of fabricating the magnetic heads includes the step of forming the medium facing surfaces by polishing a surface formed by cutting the substructure. The step of fabricating the substructure includes the step of forming first and second indicators that are located in such regions that portions of the first and second indicators are exposed in the medium facing surfaces when the medium facing surfaces are formed, the first and second indicators indicating a target location of the medium facing surfaces that is a location at which the medium facing surfaces are to be formed. Widths of the first and second indicators are equal at the target location of the medium facing surfaces, and one of the widths of the first and second indicators decreases while the other increases with shifts in position along the direction orthogonal to the medium facing surfaces.

According to the method of manufacturing the magnetic heads of the invention, in the step of fabricating the magnetic heads, it is possible to know whether the medium facing surfaces are formed at the target location by observing the widths of the first and second indicators in the medium facing surfaces. According to the method of the invention, when the medium facing surfaces are formed by polishing the surface formed by cutting the substructure, the closer the polished surface to the target location of the medium facing surfaces, the smaller is the difference between the widths of the first and second indicators in the polished surface.

In the method of the invention, in the substructure, the difference between the widths of the first and second indicators taken at a deviating position that deviates from the target location of the medium facing surfaces in the direction orthogonal to the medium facing surfaces may be proportional to the amount of deviation of the deviating position from the target location of the medium facing surfaces.

In the method of the invention, each of the magnetic heads may further comprise a magnetoresistive element that has an end located in the medium facing surface and that reads data stored on the recording medium, and the distance between the substrate and each of the first and second indicators may be closer to the distance between the substrate and the track width defining portion than the distance between the substrate and the magnetoresistive element. In this case, the magnetoresistive element is formed together with the pole layer and the coil in each of the pre-head portions in the step of fabricating the substructure.

In the method of the invention, in each of the magnetic heads, the end face of the track width defining portion located in the medium facing surface may have a width that decreases as the distance from the substrate decreases.

In the method of the invention, the step of fabricating the substructure may further include the step of forming an encasing layer having grooves that accommodate the pole layers, and the pole layers may be formed in the grooves of the encasing layer.

The step of forming the encasing layer may include the steps of: forming a nonmagnetic layer that will be the encasing layer by forming the grooves therein later; forming a nonmagnetic conductive layer made of a nonmagnetic conductive material on a top surface of the nonmagnetic layer; patterning the nonmagnetic conductive layer so that penetrating openings are formed in the nonmagnetic conductive layer, each of the openings having a shape corresponding to a plane geometry of each of the pole layers; and forming the grooves in the nonmagnetic layer by selectively etching portions of the nonmagnetic layer exposed from the openings of the nonmagnetic conductive layer so that the nonmagnetic layer is formed into the encasing layer. In this case, the step of forming the first and second indicators may be performed at the same time as the step of patterning the nonmagnetic conductive layer, and the first and second indicators may be formed of portions of the nonmagnetic conductive layer.

The step of forming the encasing layer may include the steps of: forming a nonmagnetic layer that will be the encasing layer by forming the grooves therein later; and forming grooves that accommodate the pole layers and grooves that accommodate the first and second indicators in the nonmagnetic layer. In this case, in the step of fabricating the substructure, plating may be performed to form the pole layers in the grooves that accommodate the pole layers and to form the first and second indicators in the grooves that accommodate the first and second indicators.

In the method of the invention, portions of the first and second indicators may be located in regions that will remain in the magnetic heads. Alternatively, the first and second indicators may be located in regions that will not remain in the magnetic heads.

In the method of the invention, the step of fabricating the substructure may further include the step of forming reference portions located in such regions that portions of the reference portions are exposed in the medium facing surfaces when the medium facing surfaces are formed, and each of the reference portions may have a width that is equal to the width of each of the first and second indicators taken at the target location of the medium facing surfaces and that does not change with shifts in position along the direction orthogonal to the medium facing surface.

In the method of the invention, the step of fabricating the substructure may further include the step of forming at least one pair of third and fourth indicators that are located in such regions that portions of the third and fourth indicators are exposed in the medium facing surfaces when the medium facing surfaces are formed, the third and fourth indicators indicating a position that deviates from the target location of the medium facing surfaces in the direction orthogonal to the medium facing surfaces. In addition, widths of the third and fourth indicators may be equal at the position that deviates from the target location of the medium facing surfaces, and one of the widths of the third and fourth indicators may decrease while the other may increase with shifts in position along the direction orthogonal to the medium facing surfaces.

In the method of the invention, the step of forming the first and second indicators may include the step of forming indicator defining portions that define outside shapes of the first and second indicators, each of the first and second indicators may have a side that intersects in a slanting direction an imaginary surface located at the target location of the medium facing surface, and each of the indicator defining portions may incorporate: a straight-line portion that defines the side of each of the first and second indicators; and a portion that is connected to an end of the straight-line portion and that intersects the imaginary surface at a right angle or at an angle closer to the right angle than does the straight-line portion.

In the method of the invention, each of the first and second indicators may have two sides corresponding to two sides of equal lengths of an isosceles triangle having a base located parallel to an imaginary surface located at the target location of the medium facing surface, and a smaller one of angles formed by each of the two sides of each of the first and second indicators with respect to the imaginary surface may fall within a range of 10 to 63.4 degrees inclusive.

In the method of the invention, each of the first and second indicators may have two sides corresponding to two sides of equal lengths of an isosceles triangle having a base located parallel to an imaginary surface located at the target location of the medium facing surface. In addition, where a smaller one of angles formed by each of the two sides of each of the first and second indicators with respect to the imaginary surface is defined as θ, the angle θ may be of such a value that 2/tan θ is an integer.

In the method of the invention, the magnetic heads may be those intended for use for a perpendicular magnetic recording system.

A magnetic head substructure of the invention is used for manufacturing magnetic heads, each of the magnetic heads comprising: a medium facing surface that faces toward a recording medium; a coil that generates a magnetic field corresponding to data to be written on the recording medium; and a pole layer that incorporates a track width defining portion having an end face located in the medium facing surface, allows a magnetic flux corresponding to the field generated by the coil to pass therethrough, and generates a write magnetic field for writing the data on the recording medium.

The substructure of the invention comprises: a substrate on which the pole layers and the coils are stacked; a plurality of sets of the pole layer and the coil formed on the substrate so that a plurality of rows of pre-head portions that will be the respective magnetic heads later are aligned; and first and second indicators that are located in such regions that portions of the first and second indicators are exposed in the medium facing surfaces when the medium facing surfaces are formed, the first and second indicators indicating a target location of the medium facing surfaces that is a location at which the medium facing surfaces are to be formed. Widths of the first and second indicators are equal at the target location of the medium facing surfaces, and one of the widths of the first and second indicators decreases while the other increases with shifts in position along a direction orthogonal to the medium facing surfaces.

According to the magnetic head substructure of the invention, when the magnetic heads are fabricated through the use of the substructure, it is possible to know whether the medium facing surfaces are formed at the target location by observing the widths of the first and second indicators in the medium facing surfaces. According to the substructure of the invention, when the medium facing surfaces are formed by polishing the surface formed by cutting the substructure, the closer the polished surface to the target location of the medium facing surfaces, the smaller is the difference between the widths of the first and second indicators in the polished surface.

In the substructure of the invention, the difference between the widths of the first and second indicators taken at a deviating position that deviates from the target location of the medium facing surfaces in the direction orthogonal to the medium facing surfaces may be proportional to the amount of deviation of the deviating position from the target location of the medium facing surfaces.

In the substructure of the invention, each of the magnetic heads may further comprise a magnetoresistive element that has an end located in the medium facing surface and that reads data stored on the recording medium, and the distance between the substrate and each of the first and second indicators may be closer to the distance between the substrate and the track width defining portion than the distance between the substrate and the magnetoresistive element.

In the substructure of the invention, in each of the magnetic heads, the end face of the track width defining portion located in the medium facing surface may have a width that decreases as a distance from the substrate decreases.

The substructure of the invention may further comprise an encasing layer having grooves that accommodate the pole layers.

The substructure of the invention may further comprise a nonmagnetic conductive layer made of a nonmagnetic conductive material and disposed on a top surface of the encasing layer. In addition, the nonmagnetic conductive layer may have penetrating openings, edges of the openings may be located directly above edges of the grooves in the top surface of the encasing layer, and the first and second indicators may be formed of portions of the nonmagnetic conductive layer.

In the substructure of the invention, the encasing layer may have grooves that accommodate the pole layers and grooves that accommodate the first and second indicators, and the first and second indicators may be made of a material the same as a material of the pole layers.

In the substructure of the invention, portions of the first and second indicators may be located in regions that will remain in the magnetic heads. Alternatively, the first and second indicators may be located in regions that will not remain in the magnetic heads.

The substructure of the invention may further comprise reference portions located in such regions that portions of the reference portions are exposed in the medium facing surfaces when the medium facing surfaces are formed, and each of the reference portions may have a width that is equal to the width of each of the first and second indicators taken at the target location of the medium facing surfaces and that does not change with shifts in position along the direction orthogonal to the medium facing surfaces.

The substructure of the invention may further comprise at least one pair of third and fourth indicators that are located in such regions that portions of the third and fourth indicators are exposed in the medium facing surfaces when the medium facing surfaces are formed, the third and fourth indicators indicating a position that deviates from the target location of the medium facing surfaces in the direction orthogonal to the medium facing surfaces. In addition, widths of the third and fourth indicators are equal at the position that deviates from the target location of the medium facing surfaces, and one of the widths of the third and fourth indicators may decrease while the other may increase with shifts in position along the direction orthogonal to the medium facing surfaces.

The substructure of the invention may further comprise indicator defining portions that define outside shapes of the first and second indicators, wherein: each of the first and second indicators may have a side that intersects in a slanting direction an imaginary surface located at the target location of the medium facing surface; and each of the indicator defining portions may incorporate: a straight-line portion that defines the side of each of the first and second indicators; and a portion that is connected to an end of the straight-line portion and that intersects the imaginary surface at a right angle or at an angle closer to the right angle than does the straight-line portion.

In the substructure of the invention, each of the first and second indicators may have two sides corresponding to two sides of equal lengths of an isosceles triangle having a base located parallel to an imaginary surface located at the target location of the medium facing surface. In addition, a smaller one of angles formed by each of the two sides of each of the first and second indicators with respect to the imaginary surface may fall within a range of 10 to 63.4 degrees inclusive.

In the substructure of the invention, each of the first and second indicators may have two sides corresponding to two sides of equal lengths of an isosceles triangle having a base located parallel to an imaginary surface located at the target location of the medium facing surface. In addition, where a smaller one of angles formed by each of the two sides of each of the first and second indicators with respect to the imaginary surface is defined as $\theta$, the angle $\theta$ may be of such a value that $2/\tan\theta$ is an integer.

In the substructure of the invention, the magnetic heads may be those intended for use for a perpendicular magnetic recording system.

A magnetic head of the invention comprises: a medium facing surface that faces toward a recording medium; a coil that generates a magnetic field corresponding to data to be written on the recording medium; a pole layer that incorporates a track width defining portion having an end face located in the medium facing surface, allows a magnetic flux corresponding to the field generated by the coil to pass therethrough, and generates a write magnetic field for writing the data on the recording medium; a substrate on which the pole layers and the coils are stacked; and first and second indicators that are located in such regions that portions of the first and second indicators are exposed in the medium facing surface, the first and second indicators indicating a target location of the medium facing surface that is a location at which the medium facing surface is to be formed. Widths of the first and second indicators are equal at the target location of the medium facing surface, and one of the widths of the first and second indicators decreases while the other increases with shifts in position along a direction orthogonal to the medium facing surfaces.

According to the magnetic head of the invention, it is possible to know whether the medium facing surface is formed at the target location by observing the widths of the first and second indicators in the medium facing surface. In the magnetic head of the invention, the closer the medium facing surface to the target location of the medium facing surface, the smaller is the difference between the widths of the first and second indicators in the medium facing surface.

In the magnetic head of the invention, the difference between the widths of the first and second indicators taken in the medium facing surface may be proportional to an amount of deviation of the medium facing surface from the target location of the medium facing surface.

The magnetic head of the invention may further comprise a magnetoresistive element that has an end located in the medium facing surface and that reads data stored on the recording medium, wherein the distance between the substrate and each of the first and second indicators may be closer to the distance between the substrate and the track width defining portion than the distance between the substrate and the magnetoresistive element.

In the magnetic head of the invention, the end face of the track width defining portion located in the medium facing surface may have a width that decreases as a distance from the substrate decreases.

The magnetic head of the invention may further comprise an encasing layer having a groove that accommodates the pole layer.

The magnetic head of the invention may further comprise a nonmagnetic conductive layer made of a nonmagnetic conductive material and disposed on a top surface of the encasing layer, wherein: the nonmagnetic conductive layer may have a penetrating opening, and an edge of the opening may be located directly above an edge of the groove in the top surface of the encasing layer; and the first and second indicators may be formed of portions of the nonmagnetic conductive layer.

In the magnetic head of the invention, the encasing layer may have a groove that accommodates the pole layer and grooves that accommodate the first and second indicators and the first and second indicators may be made of a material the same as a material of the pole layer.

The magnetic head of the invention may further comprise a reference portion located in such a region that a portion of the reference portion is exposed in the medium facing surface, and the reference portion may have a width that is equal to the width of each of the first and second indicators taken at the target location of the medium facing surface and that does not change with shifts in position along the direction orthogonal to the medium facing surface.

The magnetic head of the invention may further comprise at least one pair of third and fourth indicators that are located in such regions that portions of the third and fourth indicators are exposed in the medium facing surface, the third and fourth indicators indicating a position that deviates from the target location of the medium facing surface. In addition, widths of the third and fourth indicators may be equal at the position that deviates from the target location of the medium facing surface, and one of the widths of the third and fourth indicators may decrease while the other may increase with shifts in position along the direction orthogonal to the medium facing surfaces.

The magnetic head of the invention may further comprise an indicator defining portion that defines outside shapes of the first and second indicators. In addition, each of the first and second indicators may have a side that intersects in a slanting direction an imaginary surface located at the target location of the medium facing surface, and the indicator defining portion may incorporate: a straight-line portion that defines the side of each of the first and second indicators; and a portion that is connected to an end of the straight-line portion and that intersects the imaginary surface at a right angle or at an angle closer to the right angle than does the straight-line portion.

In the magnetic head of the invention, each of the first and second indicators may have two sides corresponding to two sides of equal lengths of an isosceles triangle having a base located parallel to an imaginary surface located at the target location of the medium facing surface. In addition, a smaller one of angles formed by each of the two sides of each of the first and second indicators with respect to the imaginary surface may fall within a range of 10 to 63.4 degrees inclusive.

In the magnetic head of the invention, each of the first and second indicators may have two sides corresponding to two sides of equal lengths of an isosceles triangle having a base located parallel to an imaginary surface located at the target location of the medium facing surface. In addition, where a smaller one of angles formed by each of the two sides of each of the first and second indicators with respect to the imaginary surface is defined as $\theta$, the angle $\theta$ may be of such a value that $2/\tan \theta$ is an integer.

The magnetic head of the invention may be intended for use for a perpendicular magnetic recording system.

According to the method of manufacturing the magnetic heads or according to the magnetic head substructure of the invention, it is possible to know whether the medium facing surfaces are formed at the target location by observing the widths of the first and second indicators in the medium facing surfaces. According to the invention, when the medium facing surfaces are formed by polishing the surface formed by cutting the substructure, the closer the polished surface to the target location of the medium facing surfaces, the smaller is the difference between the widths of the first and second indicators in the polished surface. Because of these features of the invention, it is possible to form the medium facing surfaces at a desired location with accuracy.

In the method of manufacturing the magnetic heads or in the magnetic head substructure of the invention, the difference between the widths of the first and second indicators taken at a deviating position that deviates from the target location of the medium facing surfaces in the direction orthogonal to the medium facing surfaces may be proportional to the amount of deviation of the deviating position from the target location of the medium facing surfaces. In this case, when the medium facing surfaces are formed by polishing the surface formed by cutting the substructure, the amount of deviation of the polished surface from the target location of the medium facing surfaces can be determined from the difference between the widths of the first and second indicators taken in the polished surface. As a result, it is possible to form the medium facing surfaces at a desired location with higher accuracy.

According to the magnetic head of the invention, it is possible to know whether the medium facing surface is formed at the target location by observing the widths of the first and second indicators in the medium facing surface. According to the invention, the closer the medium facing surface to the target location of the medium facing surface, the smaller is the difference between the widths of the first and second indicators in the medium facing surface. Because of these features of the invention, it is possible to form the medium facing surface at a desired location with accuracy.

In the magnetic head of the invention, the difference between the widths of the first and second indicators in the medium facing surface may be proportional to an amount of deviation of the medium facing surface from the target location of the medium facing surface. In this case, the amount of deviation of the medium facing surface from the target location of the medium facing surface can be determined from the difference between the widths of the first and second indicators taken in the medium facing surface.

Other and further objects, features and advantages of the invention will appear more fully from the following description.

DETAILED DESCRIPTION OF THE PREFERRED EMBODIMENTS

First Embodiment

Figure 4:
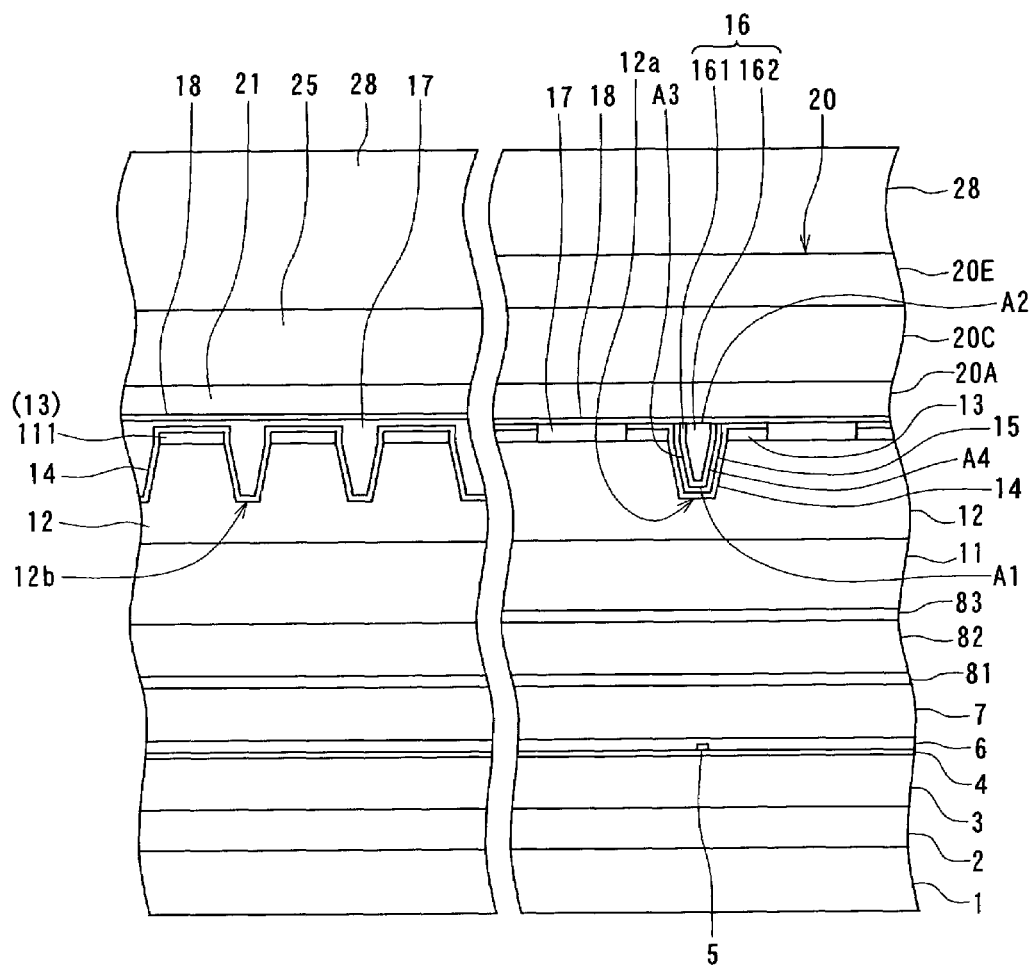
FIG. 4 is a front view of the medium facing surface of a magnetic head of the first embodiment of the invention.
Figure 5:
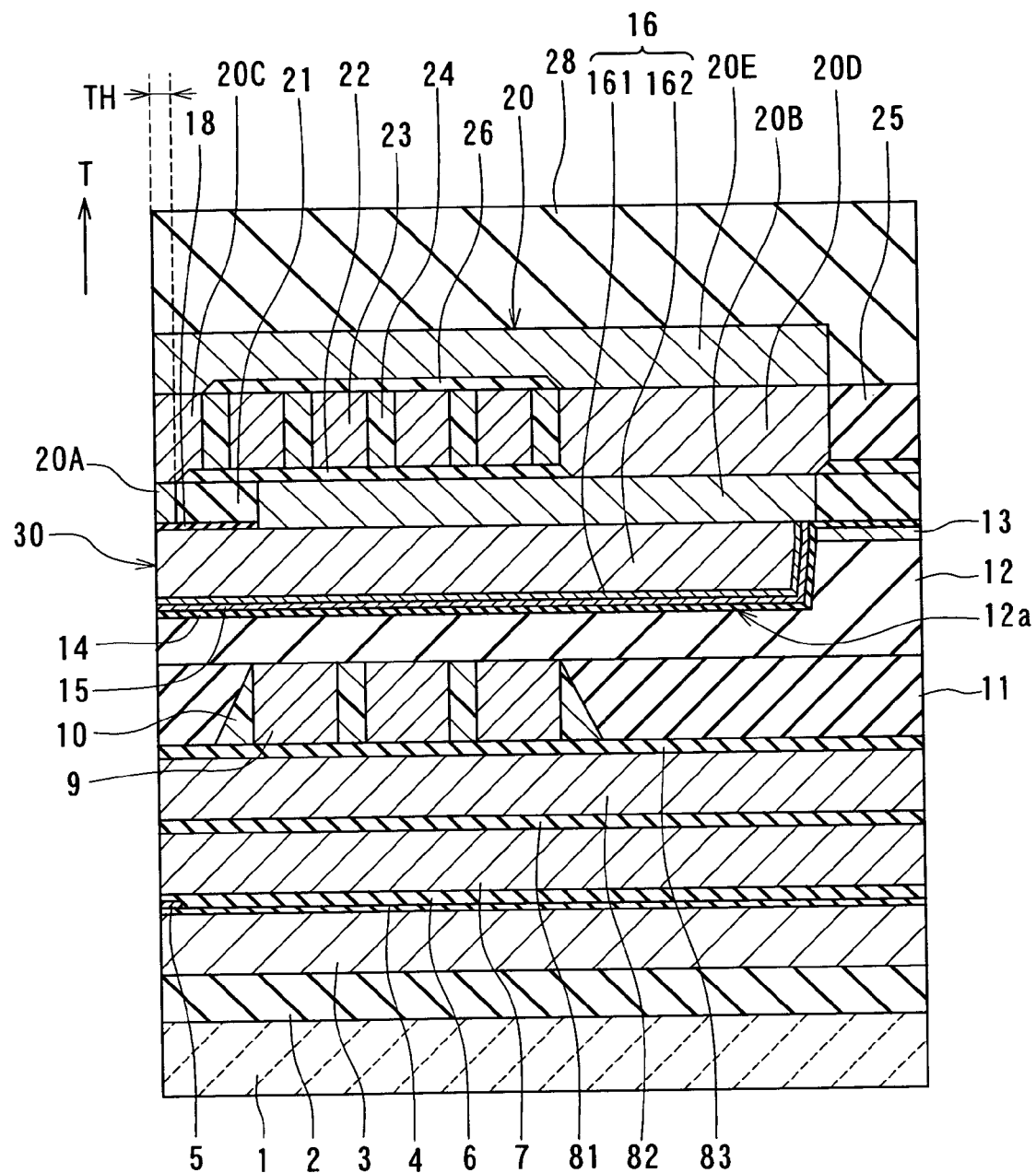
FIG. 5 is a cross-sectional view illustrating the configuration of the magnetic head of the first embodiment of the invention.

Preferred embodiments of the invention will now be described in detail with reference to the accompanying drawings. Reference is now made to FIG. 4 and FIG. 5 to describe a manufacturing method and the configuration of a magnetic head manufactured through the use of a magnetic head substructure of a first embodiment of the invention. Here, a magnetic head for the perpendicular magnetic recording system will be described as an example of the magnetic head. FIG. 4 is a front view for illustrating the medium facing surface of the magnetic head of the embodiment. FIG. 5 is a cross-sectional view for illustrating the configuration of the magnetic head of the embodiment. FIG. 5 illustrates a cross section orthogonal to the medium facing surface and a surface of a substrate. The arrow indicated with T in FIG. 5 shows the direction of travel of a recording medium.

As shown in FIG. 4 and FIG. 5, the magnetic head of the embodiment comprises: a substrate 1 made of a ceramic such as aluminum oxide and titanium carbide ($Al_2O_3$—TiC); an insulating layer 2 made of an insulating material such as alumina ($Al_2O_3$) and disposed on the substrate 1; a bottom shield layer 3 made of a magnetic material and disposed on the insulating layer 2; a bottom shield gap film 4 that is an insulating film disposed on the bottom shield layer 3; a magnetoresistive (MR) element 5 as a read element disposed on the bottom shield gap film 4; a top shield gap film 6 that is an insulating film disposed on the MR element 5; and a first top shield layer 7 made of a magnetic material and disposed on the top shield gap film 6.

The MR element 5 has an end that is located in the medium facing surface 30 that faces toward a recording medium. The MR element 5 may be an element made of a magneto-sensitive film that exhibits a magnetoresistive effect, such as an anisotropic magnetoresistive (AMR) element, a giant magnetoresistive (GMR) element, or a tunnel magnetoresistive (TMR) element. The GMR element may be of a current-in-plane (CIP) type wherein a current used for detecting magnetic signals is fed in the direction nearly parallel to the plane of each layer making up the GMR element, or may be of a current-perpendicular-to-plane (CPP) type wherein a current used for detecting magnetic signals is fed in the direction nearly perpendicular to the plane of each layer making up the GMR element.

The magnetic head further comprises a nonmagnetic layer 81 and a second top shield layer 82 that are disposed on the first top shield layer 7 one by one. The nonmagnetic layer 81 is made of a nonmagnetic material such as alumina. The second top shield layer 82 is made of a magnetic material. The portions from the bottom shield layer 3 to the second top shield layer 82 make up the read head.

The magnetic head further comprises: an insulating layer 83 made of an insulating material and disposed on the second top shield layer 82; a coil 9 disposed on the insulating layer 83; an insulating layer 10 made of an insulating material and disposed around the coil 9 and in the space between the respective adjacent turns of the coil 9; and an insulating layer 11 made of an insulating material and disposed around the insulating layer 10. The coil 9 is flat-whorl-shaped. The coil 9 and the insulating layers 10 and 11 have flattened top surfaces. The insulating layers 83 and 11 are made of alumina, for example. The insulating layer 10 is made of photoresist, for example. The coil 9 is made of a conductive material such as copper.

The magnetic head further comprises an encasing layer 12 made of a nonmagnetic material and disposed on the flattened top surfaces of the coil 9 and the insulating layers 10 and 11. The encasing layer 12 has a groove 12a that opens in the top surface thereof. The encasing layer 12 may be made of an insulating material such as alumina, silicon oxide ($SiO_x$), or silicon oxynitride (SiON), or a nonmagnetic metal material such as Ru, Ta, Mo, Ti, W, NiCu, NiB or NiPd.

The magnetic head further comprises a nonmagnetic conductive layer 13 made of a nonmagnetic conductive material and disposed on the top surface of the encasing layer 12. The nonmagnetic conductive layer 13 has a penetrating opening 13a, and the edge of the opening 13a is located directly above the edge of the groove 12a in the top surface of the encasing layer 12. It is preferred that the inner wall of the opening 13a be orthogonal to the top surface of the substrate 1. The nonmagnetic conductive layer 13 may be made of any of Ta, Mo, W, Ti, Ru, Rh, Re, Pt, Pd, Ir, NiCr, NiP, NiPd, NiB, $WSi_2$, $TaSi_2$, $TiSi_2$, TiN, and TiW, for example.

The magnetic head further comprises a nonmagnetic film 14, a polishing stopper layer 15 and a pole layer 16 that are disposed in the groove 12a of the encasing layer 12 and in the opening 13a of the nonmagnetic conductive layer 13. The nonmagnetic film 14 is made of a nonmagnetic material and disposed to touch the surface of the groove 12a. A portion of the nonmagnetic film 14 is disposed on the nonmagnetic conductive layer 13, too. The pole layer 16 is made of a magnetic material and disposed apart from the surface of the groove 12a. The polishing stopper layer 15 is disposed between the nonmagnetic film 14 and the pole layer 16. The polishing stopper layer 15 also functions as a seed layer used for forming the pole layer 16 by plating. The pole layer 16 incorporates: a first layer 161 located closer to the surface of the groove 12a; and a second layer 162 located further from the surface of the groove 12a. The first layer 161 may be omitted, however.

The nonmagnetic film 14 may be made of an insulating material or a semiconductor material, for example. The insulating material as the material of the nonmagnetic film 14 may be any of alumina, silicon oxide ($SiO_x$), and silicon oxynitride (SiON). The semiconductor material as the material of the nonmagnetic film 14 may be polycrystalline silicon or amorphous silicon.

The polishing stopper layer 15 is made of a nonmagnetic conductive material. The material of the polishing stopper layer 15 may be the same as that of the nonmagnetic conductive layer 13.

Each of the first layer 161 and the second layer 162 is made of a magnetic metal material. The first layer 161 may be made of any of CoFeN, CoNiFe, NiFe, and CoFe, for example. The second layer 162 may be made of any of NiFe, CoNiFe and CoFe, for example.

The magnetic head further comprises an insulating layer 17 disposed around the nonmagnetic conductive layer 13. The insulating layer 17 is made of alumina, for example.

The magnetic head further comprises a gap layer 18 disposed on the top surfaces of the nonmagnetic conductive layer 13, the nonmagnetic film 14, the polishing stopper layer 15, the pole layer 16 and the insulating layer 17. The gap layer 18 has an opening located at a distance from the medium facing surface 30. The gap layer 18 may be made of an insulating material such as alumina or a nonmagnetic metal material such as Ru, NiCu, Ta, W, NiB or NiPd.

The magnetic head further comprises a shield layer 20. The shield layer 20 has: a first layer 20A disposed on the gap layer 18; a second layer 20C disposed on the first layer 20A; a yoke layer 20B disposed on a portion of the pole layer 16 where the opening of the gap layer 18 is formed; a coupling layer 20D disposed on the yoke layer 20B; and a third layer 20E disposed to couple the second layer 20C to the coupling layer 20D. The first layer 20A, the yoke layer 20B, the second layer 20C, the coupling layer 20D and the third layer 20E are each made of a magnetic material. These layers 20A to 20E may be made of any of CoFeN, CoNiFe, NiFe and CoFe, for example.

The magnetic head further comprises a nonmagnetic layer 21 made of a nonmagnetic material and disposed around the yoke layer 20B. A portion of the nonmagnetic layer 21 is disposed on a side of the first layer 20A. The nonmagnetic layer 21 is made of an inorganic insulating material such as alumina or coating glass. Alternatively, the nonmagnetic layer 21 may be made up of a layer of a nonmagnetic metal material and a layer of an insulating material disposed thereon. In this case, the nonmagnetic metal material may be a refractory metal such as Ta, Mo, Nb, W, Cr, Ru, or Cu.

The magnetic head further comprises: an insulating layer 22 disposed on regions of the top surfaces of the yoke layer 20B and the nonmagnetic layer 21 in which a coil 23 described later is disposed; the coil 23 disposed on the insulating layer 22; an insulating layer 24 disposed around the coil 23 and in the space between the respective adjacent turns of the coil 23; an insulating layer 25 disposed around the second layer 20C, the coupling layer 20D and the insulating layer 24; and an insulating layer 26 disposed on the coil 23 and the insulating layer 24. The coil 23 is flat-whorl-shaped. A portion of the coil 23 passes between the second layer 20C and the coupling layer 20D. The coil 23 is made of a conductive material such as copper. The second layer 20C, the coupling layer 20D, the coil 23, and the insulating layers 24 and 25 have flattened top surfaces. The insulating layer 24 is made of photoresist, for example. The insulating layers 22, 25 and 26 are made of alumina, for example.

The portions from the coil 9 to the third layer 20E of the shield layer 20 make up the write head. The magnetic head further comprises a protection layer 28 for covering the shield layer 20. The protection layer 28 is made of alumina, for example.

As described so far, the magnetic head of the embodiment comprises the medium facing surface 30 that faces toward a recording medium, the read head, and the write head. The read head and the write head are stacked on the substrate 1. The read head is disposed backward in the direction T of travel of the recording medium (that is, disposed closer to the air inflow end of the slider). The write head is disposed forward in the direction T of travel of the recording medium (that is, disposed closer to the air outflow end of the slider).

The read head comprises the MR element 5 as the read element, and the bottom shield layer 3 and the top shield layer 7 for shielding the MR element 5. Portions of the bottom shield layer 3 and the top shield layer 7 that are located on a side of the medium facing surface 30 are opposed to each other, the MR element 5 being placed between these portions. The read head further comprises: the bottom shield gap film 4 disposed between the MR element 5 and the bottom shield layer 3; and the top shield gap film 6 disposed between the MR element 5 and the top shield layer 7.

The write head comprises the coil 9, the encasing layer 12, the nonmagnetic conductive layer 13, the nonmagnetic film 14, the polishing stopper layer 15, the pole layer 16, the gap layer 18, the shield layer 20, and the coil 23. The coils 9 and 23 generate a magnetic field corresponding to data to be written on the recording medium. The coil 9 is not a component requisite for the write head and may be omitted. The nonmagnetic film 14 may be omitted.

The pole layer 16 has an end face located in the medium facing surface 30. The pole layer 16 allows the magnetic flux corresponding to the field generated by the coil 23 to pass therethrough and generates a write magnetic field for writing the data on the medium by using the perpendicular magnetic recording system.

The shield layer 20 has an end face located in the medium facing surface 30, and has a portion located away from the medium facing surface 30 and coupled to the pole layer 16. The gap layer 18 is made of a nonmagnetic material and provided between the pole layer 16 and the shield layer 20.

In the medium facing surface 30, the end face of the shield layer 20 is disposed forward of the end face of the pole layer 16 along the direction T of travel of the recording medium with a specific space created by the thickness of the gap layer 18. The thickness of the gap layer 18 falls within a range of 30 to 60 nm inclusive, for example. At least part of the coil 23 is disposed between the pole layer 16 and the shield layer 20 and insulated from the pole layer 16 and the shield layer 20.

The pole layer 16 is disposed in the groove 12a of the encasing layer 12 and in the opening 13a of the nonmagnetic conductive layer 13 with the nonmagnetic film 14 and the polishing stopper layer 15 disposed between the pole layer 16 and each of the groove 12a and the opening 13a. The nonmagnetic conductive layer 13 has a thickness that falls within a range of 20 to 80 nm inclusive, for example. The nonmagnetic film 14 has a thickness that falls within a range of 10 to 40 nm inclusive, for example. However, the thickness of the nonmagnetic film 14 is not limited to this range but may be of any other value, depending on the track width. The polishing stopper layer 15 has a thickness that falls within a range of 30 to 100 nm inclusive, for example.

The pole layer 16 incorporates: the first layer 161 located closer to the surface of the groove 12a; and the second layer 162 located further from the surface of the groove 12a. The first layer 161 has a thickness that falls within a range of 0 to 100 nm inclusive, for example. The first layer 161 having a thickness of 0 nm means that the first layer 161 is not provided.

The shield layer 20 has: the first layer 20A disposed adjacent to the gap layer 18; the second layer 20C disposed on a side of the first layer 20A further from the gap layer 18; the yoke layer 20B disposed on the portion of the pole layer 16 where the opening of the gap layer 18 is formed; the coupling layer 20D disposed on the yoke layer 20B; and the third layer 20E disposed to couple the second layer 20C to the coupling layer 20D. The second layer 20C is disposed between the medium facing surface 30 and the at least part of the coil 23.

The first layer 20A has: a first end located in the medium facing surface 30; and a second end opposite to the first end. The second layer 20C also has: a first end located in the medium facing surface 30; and a second end opposite to the first end. Throat height TH is the distance between the medium facing surface 30 and a point at which the space between the pole layer 16 and the shield layer 20 starts to increase when seen from the medium facing surface 30. In the embodiment, the throat height TH is the distance from the medium facing surface 30 to one of the ends of the first layer 20A that is further from the medium facing surface 30. The throat height TH falls within a range of 0.05 to 0.3 μm inclusive, for example. The minimum distance between the first end and the second end of the portion of the second layer 20C facing toward the pole layer 16 with the gap layer 18 and the first layer 20A disposed in between falls within a range of 0.3 to 0.8 μm inclusive, for example. The first layer 20A and the yoke layer 20B have a thickness that falls within a range of 0.3 to 0.8 μm inclusive, for example. The second layer 20C and the coupling layer 20D have a thickness that falls within a range of 1.5 to 3.0 μm inclusive, for example. The third layer 20E has a thickness that falls within a range of 2.0 to 3.0 μm inclusive, for example. The coil 23 has a thickness that is equal to or smaller than the thickness of the second layer 20C and that falls within a range of 1.5 to 3.0 μm inclusive, for example.

Figure 3:
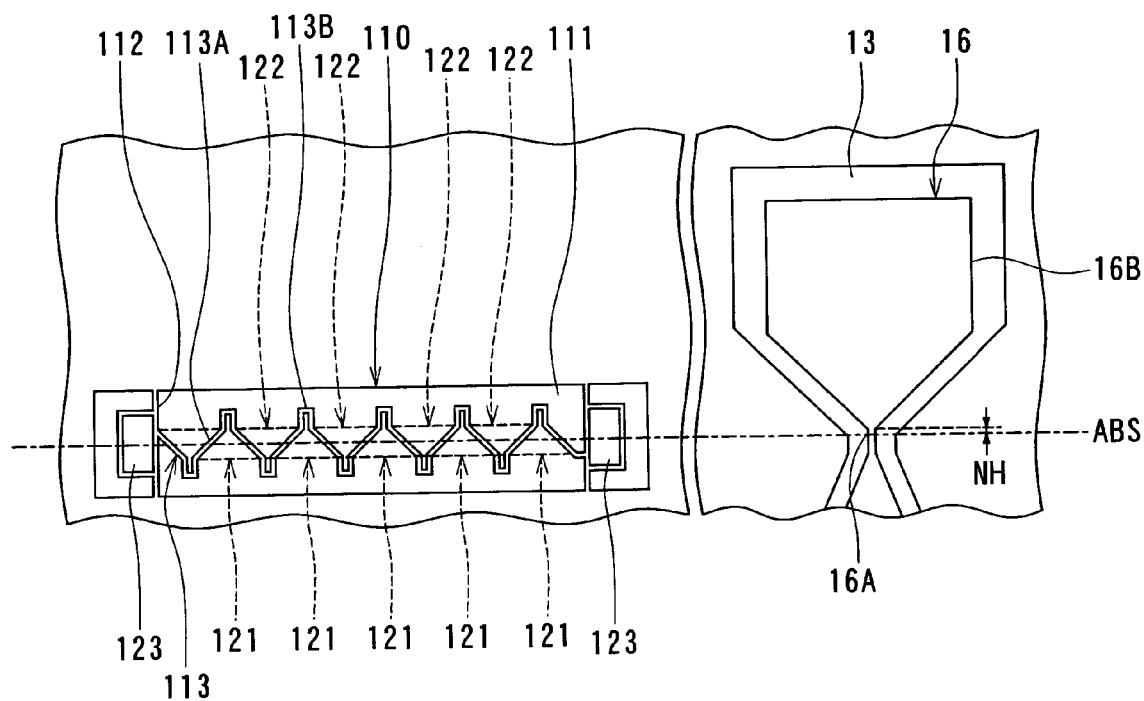
FIG. 3 is a top view of a main part of the magnetic head substructure of the first embodiment of the invention.

Reference is now made to FIG. 3 and FIG. 4 to describe the shape of the pole layer 16 in detail. FIG. 3 is a top view of a main part of a magnetic head substructure of the embodiment. The magnetic head substructure is used for manufacturing the magnetic head of the embodiment. The configuration of the substructure will be described in detail later. In FIG. 3, 'ABS' indicates an imaginary surface located at a target location of the medium facing surface 30 which is the location at which the medium facing surface 30 is to be formed. As shown in FIG. 3, the pole layer 16 incorporates a track width defining portion 16A and a wide portion 16B. The track width defining portion 16A has an end face located in the medium facing surface 30. The wide portion 16B is located further from the medium facing surface 30 than the track width defining portion 16A and has a width greater than the width of the track width defining portion 16A. The width of the track width defining portion 16A does not change in accordance with the distance from the medium facing surface 30. For example, the wide portion 16B is equal in width to the track width defining portion 16A at the interface with the track width defining portion 16A, and gradually increases in width as the distance from the medium facing surface 30 increases and then maintains a specific width to the end of the wide portion 16B. Here, the length of the track width defining portion 16A taken in the direction orthogonal to the medium facing surface 30 is called a neck height NH. The neck height NH falls within a range of 0.1 to 0.3 μm inclusive, for example.

As shown in FIG. 4, the end face of the pole layer 16 located in the medium facing surface 30 has: a first side A1 close to the substrate 1; a second side A2 opposite to the first side A1; a third side A3 connecting an end of the first side A1 to an end of the second side A2; and a fourth side A4 connecting the other end of the first side A1 to the other end of the second side A2. The second side A2 touches the gap layer 18 and defines the track width. The width of the end face of the pole layer 16 located in the medium facing surface 30 decreases as the distance from the first side A1 decreases, that is, as the distance from the substrate 1 decreases. Each of the third side A3 and the fourth side A4 forms an angle that falls within a range of 5 to 15 degrees inclusive, for example, with respect to the direction orthogonal to the top surface of the substrate 1. The length of the second side A2, that is, the track width, falls within a range of 0.05 to 0.20 μm inclusive, for example. The thickness of the pole layer 16 falls within a range of 0.15 to 0.5 μm inclusive, for example.

The end face of the pole layer 16 located in the medium facing surface 30 has: a first region; and a second region located further from the substrate 1 than the first region and connected to the first region. The first region has a width that decreases as the distance from the substrate 1 decreases. The second region has a uniform width that defines the track width. In the medium facing surface 30, the nonmagnetic conductive layer 13 exists on both sides of the second region, the sides being opposed to each other in the direction of track width.

The magnetic head of the embodiment writes data on a recording medium by using the write head and reads data written on the recording medium by using the read head. In the write head, the coil 23 generates a magnetic field that corresponds to data to be written on the medium. The pole layer 16 and the shield layer 20 form a magnetic path through which a magnetic flux corresponding to the magnetic field generated by the coil 23 passes. The pole layer 16 allows the flux corresponding to the field generated by the coil 23 to pass and generates a write magnetic field used for writing data on the medium through the use of the perpendicular magnetic recording system. The shield layer 20 takes in a disturbance magnetic field applied from outside the magnetic head to the magnetic head. It is thereby possible to prevent erroneous writing on the recording medium caused by the disturbance magnetic field intensively taken in into the pole layer 16.

According to the embodiment, in the medium facing surface 30, the end face of the shield layer 20 is disposed forward of the end face of the track width defining portion 16A along the direction T of travel of the recording medium (that is, disposed closer to the air outflow end of the slider than is the end face of the portion 16A) with a specific small space created by the gap layer 18. The location of an end of the bit pattern written on the recording medium is determined by the location of the end of the pole layer 16 that is closer to the gap layer 18 and located in the medium facing surface 30. The shield layer 20 takes in a magnetic flux generated from the end face of the pole layer 16 located in the medium facing surface 30 and extending in directions except the direction orthogonal to the surface of the recording medium so as to prevent the flux from reaching the recording medium. It is thereby possible to prevent the direction of magnetization of the bit pattern already written on the medium from being changed due to the effect of the above-mentioned flux. According to the embodiment, an improvement in linear recording density is thus achieved.

According to the embodiment, as shown in FIG. 4, the end face of the track width defining portion 16A located in the medium facing surface 30 has a width that decreases as the distance from the first side A1 decreases. It is thereby possible to prevent the problems resulting from the skew.

Figure 1:
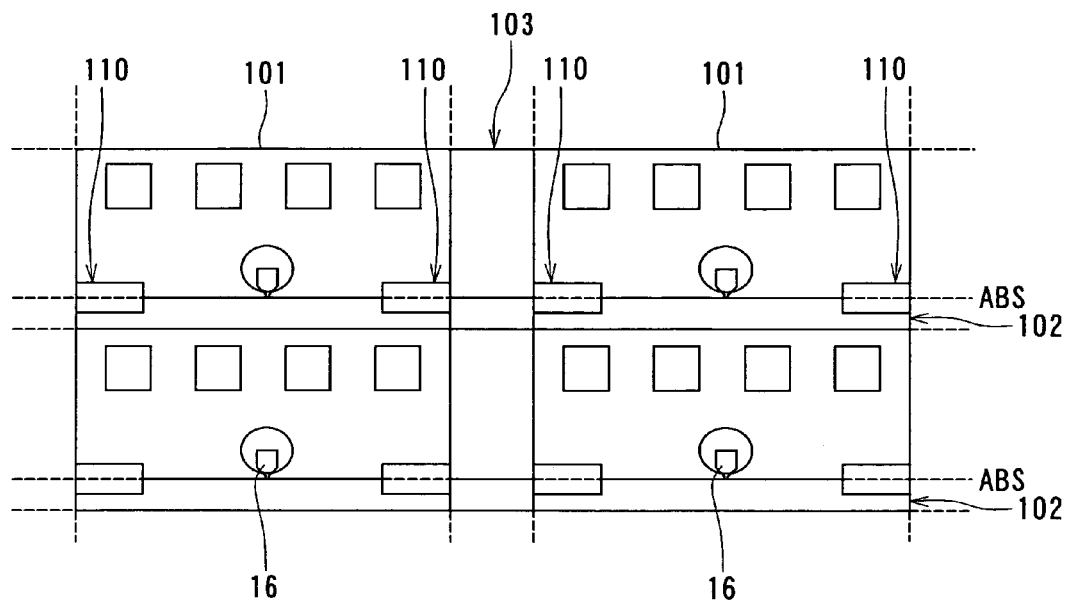
FIG. 1 is a view for illustrating a first example of arrangement of main components of a magnetic head substructure of a first embodiment of the invention.
Figure 2:
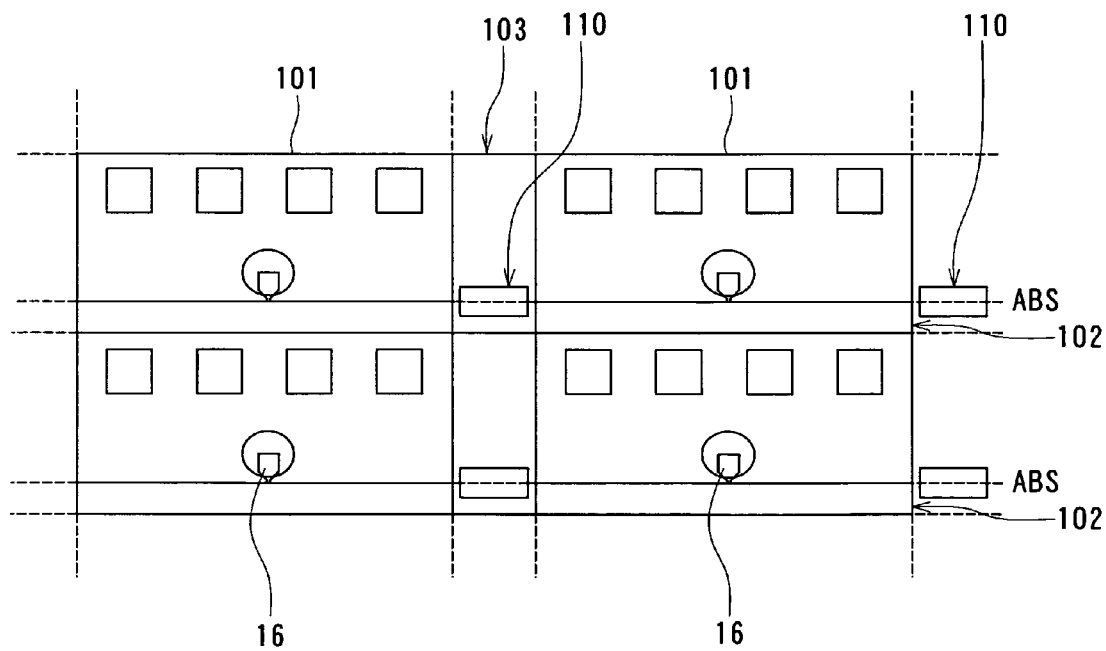
FIG. 2 is a view for illustrating a second example of arrangement of main components of the magnetic head substructure of the first embodiment of the invention.

The magnetic head substructure of the embodiment will now be described. FIG. 1 and FIG. 2 respectively illustrate a first example and a second example of arrangement of main components of the magnetic head substructure of the embodiment. As shown in FIG. 1 and FIG. 2, the substructure comprises a plurality of rows of pre-head portions 101. The pre-head portions 101 are portions that will be magnetic heads later. In FIG. 1 and FIG. 2, 'ABS' indicates an imaginary surface located at the target location of the medium facing surfaces 30. In the embodiment, a group of pre-head portions 101 arranged in the direction parallel to the medium facing surface 30, that is, in the horizontal direction of FIG. 1 and FIG. 2, is called a row of the pre-head portions 101.

The magnetic head substructure further comprises: inter-row portions 102 to be removed each of which is located between adjacent two rows; and intra-row portions 103 to be removed each of which is located between two of the pre-head portions 101 adjacent to each other in each row. Neither of the portions 102 and 103 will remain in the magnetic heads.

The magnetic head substructure further comprises indicator sections 110 for indicating the target location of the medium facing surfaces 30. Each of the indicator sections 110 is located at a point intersecting the imaginary surface ABS. The indicator sections 110 may be located in such regions that portions thereof will remain in the magnetic heads or may be located in regions that will not remain in the magnetic head. In the first example shown in FIG. 1, the indicator sections 110 are located in such regions that portions thereof will remain in the magnetic heads. In the first example, to be specific, each of the indicator sections 110 is located in a region that intersects the imaginary surface ABS and that extends across the pre-head portion 101 and the intra-row portion 102. When the magnetic heads are manufactured through the use of the substructure of the first example, portions of the indicator sections 110 remain in the magnetic heads. In the second example shown in FIG. 2, the indicator sections 110 are located in regions that will not remain in the magnetic heads. In the second example, to be specific, each of the indicator sections 110 is located in a region in the inter-row portion 103, the region intersecting the imaginary surface ABS.

FIG. 3 illustrates an example of configuration of the indicator section 110. The indicator section 110 is made up of an indicator layer 111 and an indicator defining portion 112. In addition, the indicator section 110 includes a plurality of first indicators 121, a plurality of second indicators 122, and two reference portions 123. The indicator defining portion 112 is a portion for defining the outside shapes of the first indicators 121, the second indicators 122 and the reference portions 123. A portion of the indicator section 110 other than the indicator defining portion 112 is the indicator layer 111. The first indicators 121, the second indicators 122 and the reference portions 123 are formed of respective portions of the indicator layer 111. In the embodiment, the indicator defining portion 112 is a groove formed in the indicator layer 111. The plane geometry of the entire indicator section 110 is a rectangle that is long in the direction parallel to the imaginary surface ABS and the top surface of the substrate 1 (the horizontal direction of FIG. 3). In the embodiment, the indicator layer 111 is formed of a portion of the nonmagnetic conductive layer 13.

The two reference portions 123 are located near ends of the indicator section 110, respectively, the ends being opposed to each other in the longitudinal direction. The indicator defining portion 112 includes a zigzag portion 113 located between the two reference portions 123. The first indicators 121 and the second indicators 122 are located opposite to each other with the zigzag portion 113 located in between. The first indicators 121 are located lower than the zigzag portion 113 in FIG. 3. The second indicators 122 are located higher than the zigzag portion 113 in FIG. 3. The first indicators 121 and the second indicators 122 are alternately located when seen in the direction of length of the indicator section 110 (the horizontal direction of FIG. 3).

As shown in FIG. 4, since the indicator layer 111 forming the first indicators 121 and the second indicators 122 is formed of a portion of the nonmagnetic conductive layer 13, the distance between the substrate 1 and each of the first and second indicators 121 and 122 is closer to the distance between the substrate 1 and the track width defining portion 16A than the distance between the substrate 1 and the MR element 5.

Figure 18:
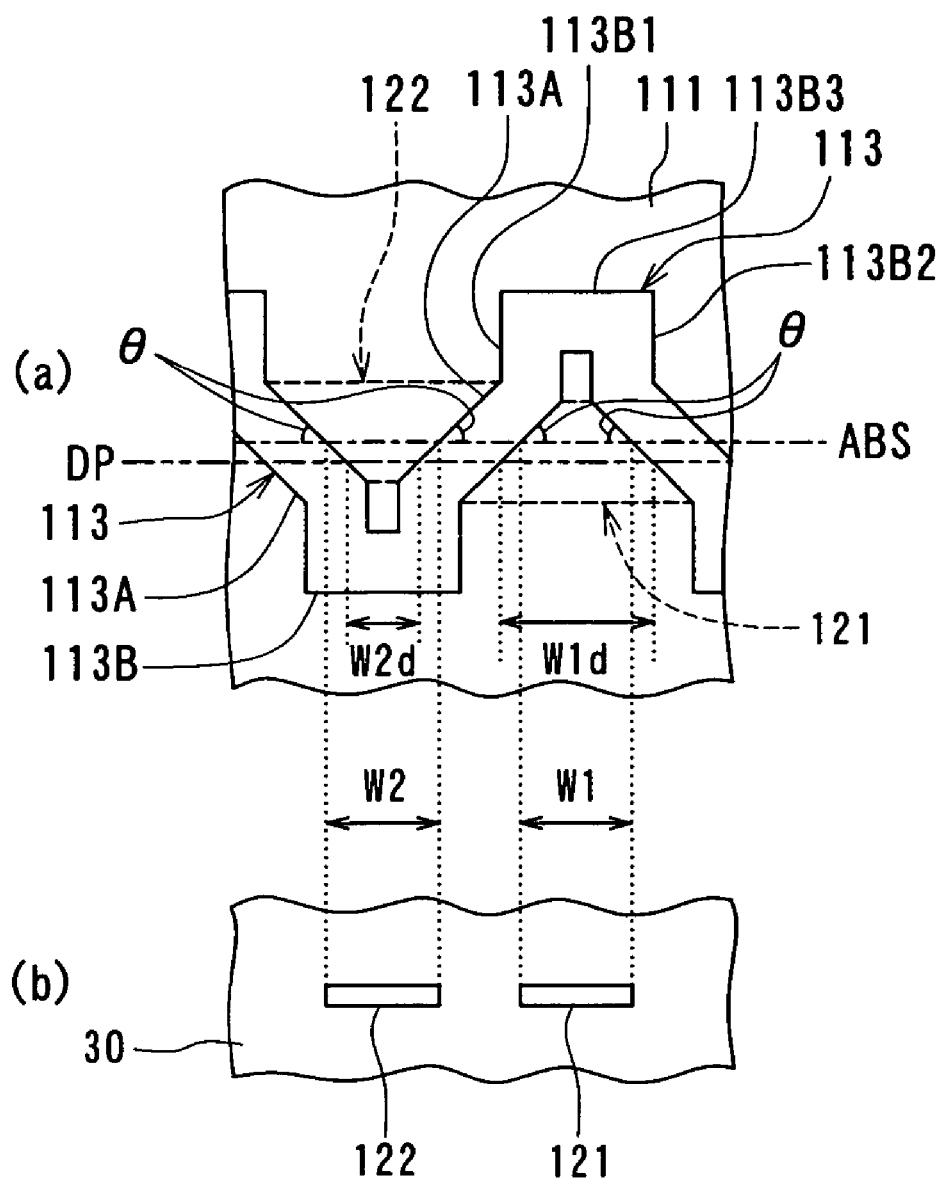
FIG. 18 is a view for illustrating a part of an indicator section of the first embodiment of the invention.

Reference is now made to FIG. 18 to describe the first indicators 121 and the second indicators 122 in detail. FIG. 18 is a view for illustrating a portion of the indicator section 110. FIG. 18(a) illustrates the portion of the indicator section 110 seen from above. FIG. 18(b) illustrates the medium facing surface 30 when it is formed at a location that coincides with the imaginary surface ABS. The zigzag portion 113 includes: a plurality of straight-line portions 113A each intersecting the imaginary surface ABS; and projecting portions 113B connected to ends of the straight-line portions 113A. In the embodiment, the projecting portions 113B connect ends of respective adjacent two of the straight-line portions 113A to each other. The respective adjacent two of the straight-line portions 113A intersect the imaginary surface ABS in a slanting direction and extend in directions different from each other. The straight-line portions 113A define sides of the first indicators 121 and the second indicators 122, the sides intersecting the imaginary surface ABS in a slanting direction. Each of the projecting portions 113B includes: a first portion 113B1 having an end connected to an end of one of adjacent two of the straight-line portions 113A; a second portion 113B2 having an end connected to an end of the other of the adjacent two of the straight-line portions 113A; and a third portion 113B3 extending in the direction parallel to the imaginary surface ABS and connecting the other end of the first portion 113B1 to the other end of the second portion 113B2. The first portion 113B1 and the second portion 113B2 intersect the imaginary surface ABS at a right angle or an angle closer to a right angle than do the straight-line portions 113A. The role of the projecting portions 113B, especially the first portions 113B1 and the second portions 113B2, is to prevent portions of the straight-line portions 113A near the ends thereof from bending when the indicator defining portion 112 is formed through the use of photolithography.

Each of the first indicators 121 and each of the second indicators 122 are formed between adjacent two of the straight-line portions 113A. Each of the first indicators 121 and the second indicators 122 has a shape of an isosceles triangle having a base located parallel to the imaginary surface ABS wherein an apex portion of the triangle is trimmed. Therefore, the first indicators 121 and the second indicators 122 each have two sides having equal lengths that intersect the imaginary surface ABS in a slanting direction. These two sides correspond to the two sides having equal lengths of the above-mentioned isosceles triangle. Here, in each of the first indicator 121 and the second indicator 122, a smaller one of angles formed by the two sides having equal lengths with respect to the imaginary surface ABS is defined as $\theta$. The angle $\theta$ is greater than 0 degree and smaller than 90 degrees.

The widths of the first and second indicators 121 and 122 are equal at the target location of the medium facing surface 30, that is, in the imaginary surface ABS. The following is a description of the way the widths of the first and second indicators 121 and 122 change with shifts in position along the direction orthogonal to the medium facing surface 30. First, if the position is shifted from a lower position toward a higher position in FIG. 18 (a), the width of the first indicator 121 decreases while the width of the second indicator 122 increases with the shift in position. In contrast, if the position is shifted from a higher position toward a lower position in FIG. 18 (a), the width of the first indicator 121 increases while the width of the second indicator 122 decreases with the shift in position. As thus described, one of the widths of the first and second indicators 121 and 122 decreases while the other increases with shifts in position along the direction orthogonal to the medium facing surface 30.

Each of the reference portions 123 has a width that is equal to the width of each of the first and second indicators 121 and 122 taken at the target location of the medium facing surface 30 and that does not change with shifts in position along the direction orthogonal to the medium facing surface 30. The reference portions 123 are located at positions that intersect the imaginary surface ABS.

Here, the widths of the first and second indicators 121 and 122 taken at the medium facing surface 30 are defined as W1 and W2, respectively. If the medium facing surface 30 is formed at the target location, the widths W1 and W2 are equal.

Then, widths of the first and second indicators 121 and 122 taken at a deviating position DP that deviates from the target location of the medium facing surface 30 along the direction orthogonal to the medium facing surface 30 are defined as W1$d$ and W2$d$, respectively. The amount of deviation D of the deviating position DP from the target location of the medium facing surface 30 is expressed by the equation (1) below, using the widths W1$d$ and W2$d$ and the above-mentioned angle $\theta$.

$$D = (\tfrac{1}{4}) \cdot (W1d - W2d) \cdot \tan\theta \quad (1)$$

As the equation (1) indicates, the difference between the widths of the first and second indicators 121 and 122, expressed as W1$d$−W2$d$, is proportional to the amount of deviation D of the deviating position DP from the target location of the medium facing surface 30.

As previously described, when each of the first and second indicators 121 and 122 has two sides that form the angle $\theta$ with respect to the imaginary surface ABS, the relationship expressed by the equation (2) below is held among the angle $\theta$, an amount (absolute value) of shift $\Delta P$ in position in the direction orthogonal to the medium facing surface 30, and an amount (absolute value) of change $\Delta W$ in width of each of the first and second indicators 121 and 122.

$$\Delta W = 2\Delta P / \tan\theta \quad (2)$$

As the equation (2) indicates, the smaller the angle $\theta$, the greater is the ratio of the amount of change $\Delta W$ in width of each of the first and second indicators 121 and 122 with respect to the amount of shift $\Delta P$ in position in the direction orthogonal to the medium facing surface 30. That is, the smaller the angle $\theta$, the greater is the sensitivity of the first and second indicators 121 and 122 to a shift in position in the direction orthogonal to the medium facing surface 30. However, the smaller the angle $\theta$, the greater is the maximum width of each of the first and second indicators 121 and 122. It is therefore impractical that the angle $\theta$ is too small. In view of these, it is preferable that the angle $\theta$ be not smaller than 10 degrees.

When the angle $\theta$ is 63.4 degrees, the values of $\Delta W$ and $\Delta P$ are nearly equal. When the angle $\theta$ is 63.4 degrees or smaller, the value of $\Delta W$ is equal to or greater than the value of $\Delta P$. When the angle $\theta$ is greater than 63.4 degrees, the value of $\Delta W$ is smaller than the value of $\Delta P$. From the viewpoint of enhancing the sensitivity of the first and second indicators 121 and 122 to some extent, it is preferred that the value of $\Delta W$ be equal to or greater than the value of $\Delta P$ and that the angle $\theta$ be 63.4 degrees or smaller.

The equation (2) is transformed to obtain the equation (3) below.

$$\Delta W / \Delta P = 2/\tan\theta \quad (3)$$

As the equation (3) indicates, if the value of $2/\tan\theta$ is an integer, the value of $\Delta W/\Delta P$ is also an integer. In this case, the relationship between $\Delta W$ and $\Delta P$ is shown with higher clarity and it is easier to calculate to obtain the value of $\Delta P$ from the value of $\Delta W$. In view of this, it is preferred that the angle $\theta$ be of such a value that the value of $2/\tan\theta$ is an integer. Such a value of the angle $\theta$ may be 63.4, 45, 33.7, 26.6, 21.8 or 18.4 degrees, for example.

A method of manufacturing the magnetic head of the embodiment will now be described. The method of the embodiment comprises the steps of: fabricating the magnetic head substructure in which a plurality of rows of pre-head portions 101 are aligned by forming components of a plurality of magnetic heads on a single substrate; and fabricating the magnetic heads by separating the pre-head portions 101 from one another through cutting the magnetic head substructure. Reference is now made to FIG. 6 to FIG. 17 to describe the step of fabricating the substructure in detail.

According to the method of manufacturing the magnetic head of the embodiment, as shown in FIG. 4 and FIG. 5, the insulating layer 2, the bottom shield layer 3 and the bottom shield gap film 4 are first formed on the substrate 1 one by one. Next, the MR element 5 and leads not shown connected to the MR element 5 are formed on the bottom shield gap film 4. Next, the MR element 5 and the leads are covered with the top shield gap film 6. Next, the top shield layer 7, the nonmagnetic layer 81, the second top shield layer 82 and the insulating layer 83 are formed one by one on the top shield gap film 6. Next, the coil 9 and the insulating layers 10 and 11 are formed on the insulating layer 83. Next, the top surfaces of the coil 9 and the insulating layers 10 and 11 are polished by CMP, for example.

Figure 6:
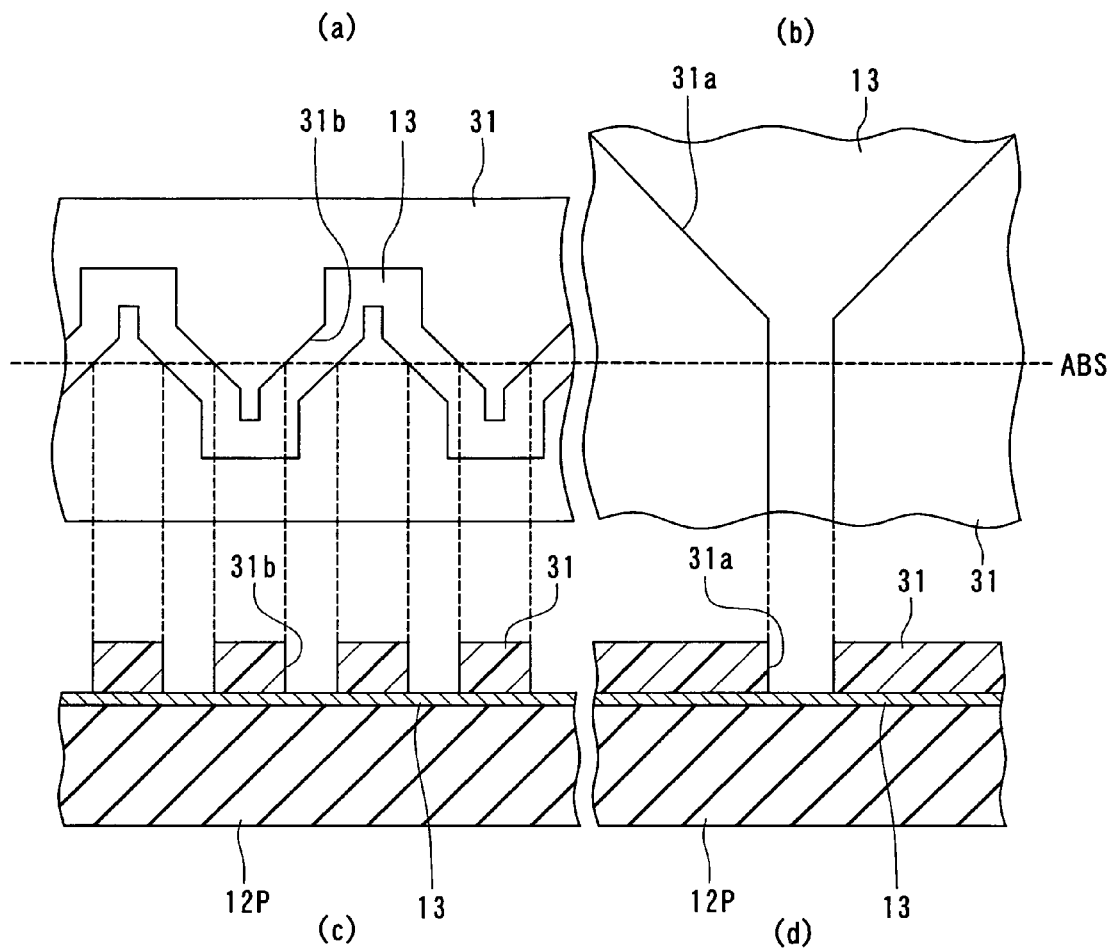
FIG. 6 is a view for illustrating a step of a method of manufacturing the magnetic head of the first embodiment of the invention.

FIG. 6 illustrates the following step. FIG. 6 shows the top surface and cross sections of a layered structure obtained in the course of the manufacturing process of the magnetic head of the embodiment. FIG. 6(a) shows the top surface in the region in which the indicator section 110 is located. FIG. 6(b) shows the top surface in the region in which the pole layer 16 is located. FIG. 6(c) shows the cross section in the region in which the indicator section 110 is located. FIG. 6(d) shows the cross section in the region in which the pole layer 16 is located.

In this step, first, a nonmagnetic layer 12P is formed on the flattened top surfaces of the coil 9 and the insulating layers 10 and 11. The nonmagnetic layer 12P will be formed into the encasing layer 12 by forming the groove 12a therein later. Next, the nonmagnetic conductive layer 13 is formed on the nonmagnetic layer 12P by a method such as sputtering. Next, a photoresist layer having a thickness of 1.0 μm, for example, is formed on the nonmagnetic conductive layer 13. The photoresist layer is then patterned to form a mask 31 for patterning the nonmagnetic conductive layer 13. The mask 31 has an opening 31a having a shape corresponding to the groove 12a and an opening 31b having a shape corresponding to the indicator defining portion 112.

Figure 7:
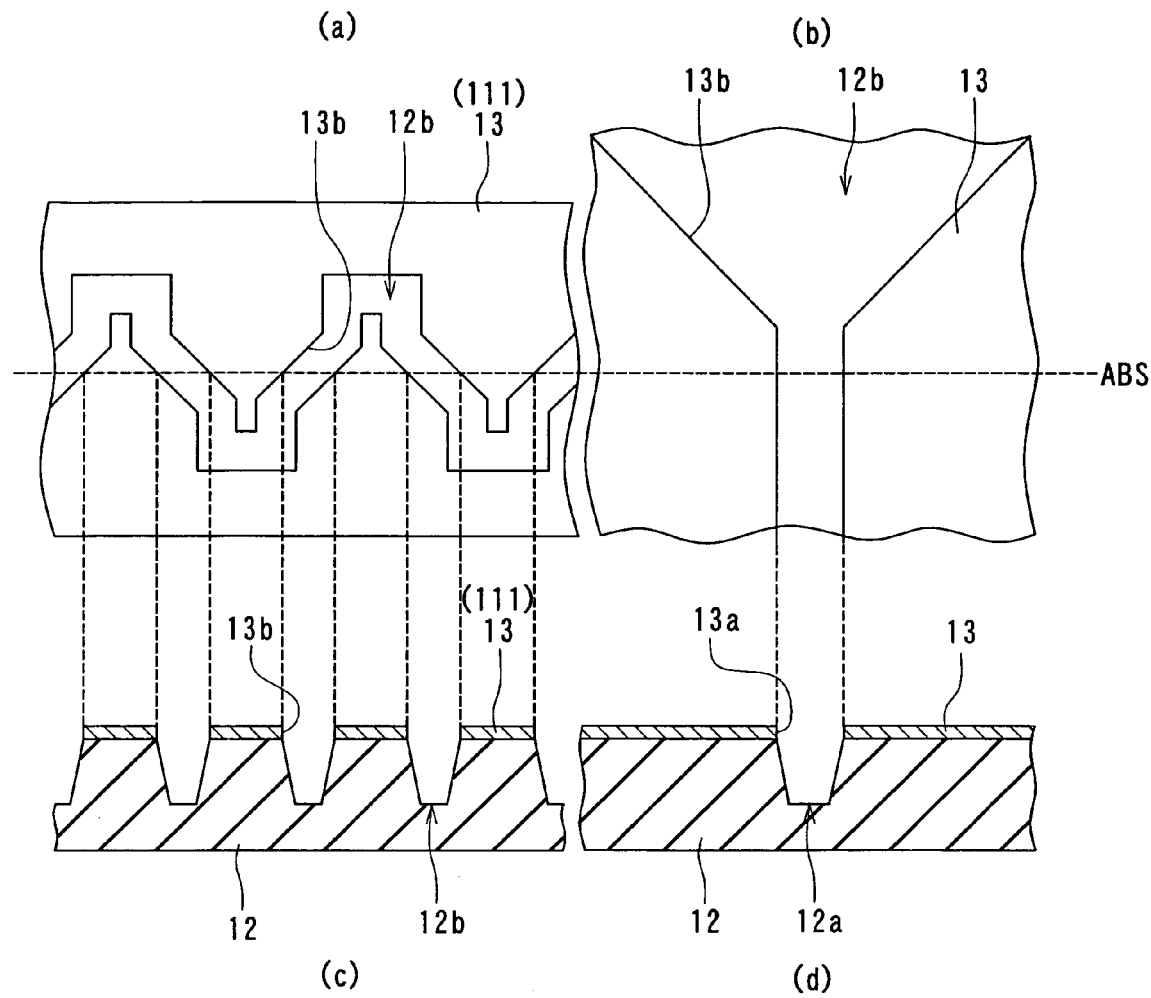
FIG. 7 is a view for illustrating a step that follows the step shown in FIG. 6.

FIG. 7 illustrates the following step. FIG. 7 shows top surfaces and cross sections of the layered structure obtained in the step that follows the step illustrated in FIG. 6. FIG. 7(a) shows the top surface in the region in which the indicator section 110 is located. FIG. 7(b) shows the top surface in the region in which the pole layer 16 is located. FIG. 7(c) shows the cross section in the region in which the indicator section 110 is located. FIG. 7(d) shows the cross section in the region in which the pole layer 16 is located.

In the step, first, the nonmagnetic conductive layer 13 is selectively etched by using the mask 31. Penetrating openings 13a and 13b are thereby formed in the nonmagnetic conductive layer 13. The opening 13a is formed in a region corresponding to the opening 31a of the mask 31 and has a shape corresponding to the plane geometry of the pole layer 16 to be formed later. The opening 13b is formed in a region corresponding to the opening 31b of the mask 31 and forms the indicator defining portion 112. In the region where the indicator section 110 is to be located, the nonmagnetic conductive layer 13 is patterned to form the opening 13b, and the nonmagnetic conductive layer 13 thus patterned is formed into the indicator layer 111. The indicator section 110 is thus formed of a portion of the nonmagnetic conductive layer 13.

Furthermore, in the step shown in FIG. 7, portions of the nonmagnetic layer 12P exposed from the openings 13a and 13b of the nonmagnetic conductive layer 13 are selectively etched. As a result, the grooves 12a and 12b are formed in the nonmagnetic layer 12P in the regions corresponding to the openings 13a and 13b, respectively. The nonmagnetic layer 12P is formed into the encasing layer 12 by forming the grooves 12a and 12b therein. Next, the mask 31 is removed.

The etching of each of the nonmagnetic conductive layer 13 and the nonmagnetic layer 12P is performed by reactive ion etching or ion beam etching, for example. The nonmagnetic conductive layer 13 is etched such that the sidewalls of the openings 13a and 13b formed by the etching are made orthogonal to the top surface of the substrate 1. If reactive ion etching is employed to etch the nonmagnetic conductive layer 13, an etching gas containing $Cl_2$ and $BCl_3$, for example, may be used. If reactive ion etching is employed to etch the nonmagnetic layer 12P, it is preferred to use an etching gas containing a first gas that contains chlorine (CL) or bromine (Br) and a second gas that contains fluorine (F). The first gas includes any of $BCl_3$, $Cl_2$, $BBr_3$ and HCl, for example. The second gas includes any of $CF_4$, $C_2F_6$, $SF_6$ and $CHF_3$, for example. The nonmagnetic layer 12P is etched such that the walls of the groove 12a corresponding to both sides of the track width defining portion 16A of the pole layer 16 each form an angle that falls within a range of 5 to 15 degrees inclusive, for example, with respect to the direction orthogonal to the top surface of the substrate 1.

Figure 8:
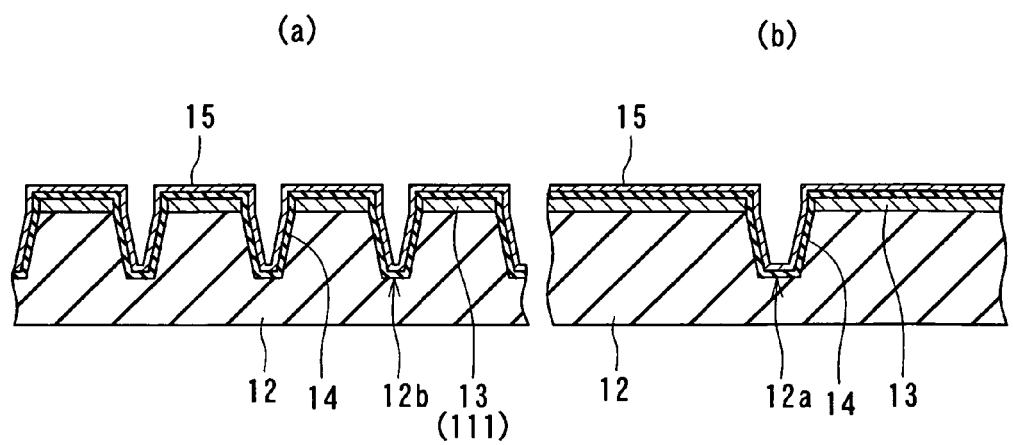
FIG. 8 is a cross-sectional view of the layered structure obtained in a step that follows the step shown in FIG. 7.

FIG. 8 illustrates the following step. FIG. 8 shows cross sections of the layered structure obtained in the step that follows the step illustrated in FIG. 7. FIG. 8(a) shows the cross section in the region in which the indicator section 110 is located. FIG. 8(b) shows the cross section in the region in which the pole layer 16 is located. In the step, first, the nonmagnetic film 14 is formed on the entire top surface of the layered structure. The nonmagnetic film 14 is formed in the grooves 12a and 12b, too. The nonmagnetic film 14 may be formed by sputtering or chemical vapor deposition (hereinafter referred to as CVD), for example. It is possible to control the thickness of the nonmagnetic film 14 with precision. If the nonmagnetic film 14 is formed by CVD, it is preferred to employ a method called 'atomic layer CVD' (hereinafter referred to as ALCVD) in which formation of a single atomic layer is repeated. In this case, it is possible to control the thickness of the nonmagnetic film 14 with higher precision. If the nonmagnetic film 14 is formed by ALCVD, the nonmagnetic film 14 is preferably made of alumina. If the nonmagnetic film 14 is made of a semiconductor material, it is preferred to form the nonmagnetic film 14 by ALCVD at a low temperature (around 200° C.) or by low-pressure CVD at a low temperature. The semiconductor material as the material of the nonmagnetic film 14 is preferably undoped polycrystalline silicon or amorphous silicon.

Next, the polishing stopper layer 15 is formed by sputtering or ALCVD, for example, on the entire top surface of the layered structure. The polishing stopper layer 15 is formed in the grooves 12a and 12b, too. The polishing stopper layer 15 indicates the level at which polishing to be performed later is stopped.

Figure 9:
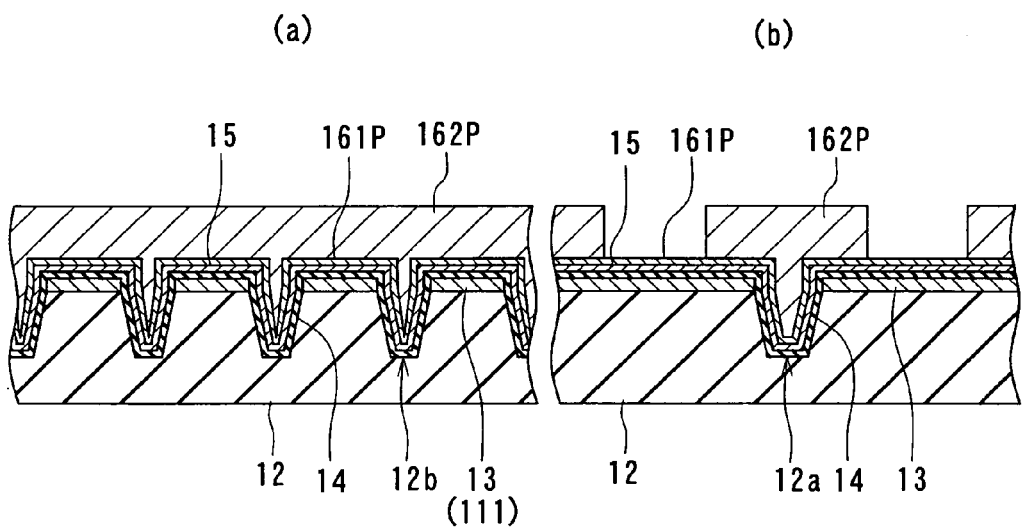
FIG. 9 is a cross-sectional view of the layered structure obtained in a step that follows the step shown in FIG. 8.

FIG. 9 illustrates the following step. FIG. 9 shows cross sections of the layered structure obtained in the step that follows the step illustrated in FIG. 8. FIG. 9(a) shows the cross section in the region in which the indicator section 110 is located. FIG. 9(b) shows the cross section in the region in which the pole layer 16 is located. In the step, first, a first magnetic layer 161P is formed on the entire top surface of the layered structure. The first magnetic layer 161P will be the first layer 161 of the pole layer 16. The first magnetic layer 161P is formed by sputtering or ion beam deposition, for example. If the first magnetic layer 161P is formed by sputtering, it is preferred to employ collimation sputtering or long throw sputtering. Since the first layer 161 may be omitted as previously mentioned, it is not always necessary to form the first magnetic layer 161P.

Next, a second magnetic layer 162P is formed on the first magnetic layer 161P. The second magnetic layer 162P will be the second layer 162 of the pole layer 16. The second magnetic layer 162P is formed such that the grooves 12a and 12b are filled with the second magnetic layer 162P and the top surface thereof is located higher than the top surfaces of the nonmagnetic conductive layer 13, the nonmagnetic film 14 and the polishing stopper layer 15. The second magnetic layer 162P is formed by frame plating, for example, wherein the first magnetic layer 161P is used as an electrode for plating. If the polishing stopper layer 15 is made of a conductive material, the stopper layer 15 is also used an electrode for plating. The second magnetic layer 162P may be formed by forming an unpatterned plating layer and then patterning the plating layer by etching.

Figure 10:
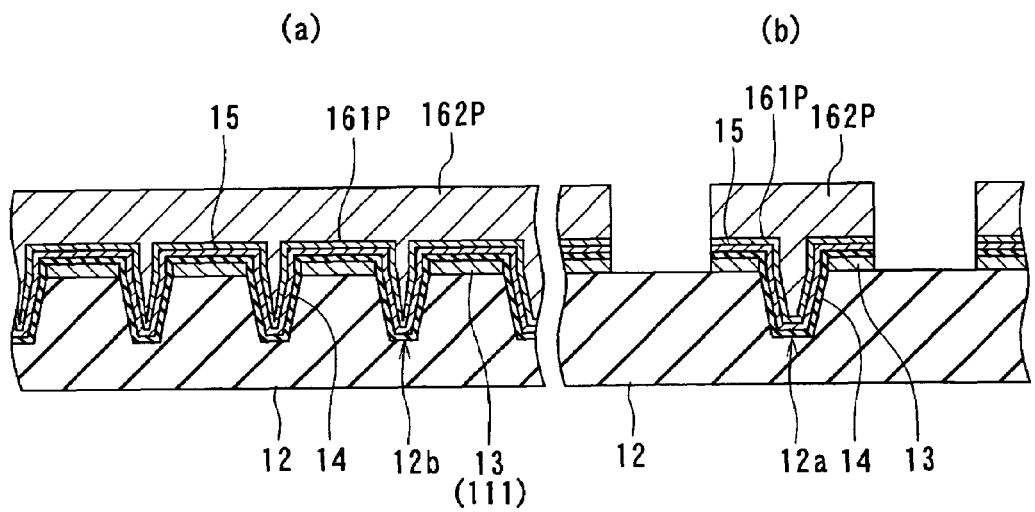
FIG. 10 is a cross-sectional view of the layered structure obtained in a step that follows the step shown in FIG. 9.

FIG. 10 illustrates the following step. FIG. 10 shows cross sections of the layered structure obtained in the step that follows the step illustrated in FIG. 9. FIG. 10(a) shows the cross section in the region in which the indicator section 110 is located. FIG. 10(b) shows the cross section in the region in which the pole layer 16 is located. In the step, ion beam etching, for example, is performed to remove portions of the nonmagnetic conductive layer 13, the nonmagnetic film 14, the polishing stopper layer 15 and the first magnetic layer 161P other than portions existing below the second magnetic layer 162P.

Figure 11:
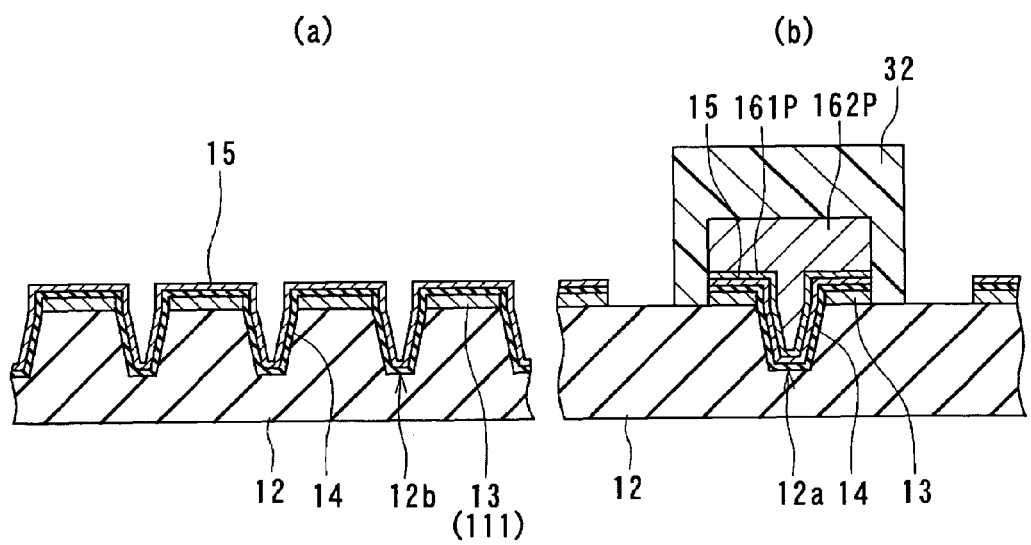
FIG. 11 is a cross-sectional view of the layered structure obtained in a step that follows the step shown in FIG. 10.

FIG. 11 illustrates the following step. FIG. 11 shows cross sections of the layered structure obtained in a step that follows the step illustrated in FIG. 10. FIG. 11(a) shows the cross section in the region in which the indicator section 110 is located. FIG. 11(b) shows the cross section in the region in which the pole layer 16 is located. In the step, first, a mask 32 made of photoresist, for example, is formed to cover portions of the second magnetic layer 162P located in and around the groove 12a. Next, portions of the second magnetic layer 162P and the first magnetic layer 161P that are not covered with the mask 32 are removed by etching.

Figure 12:
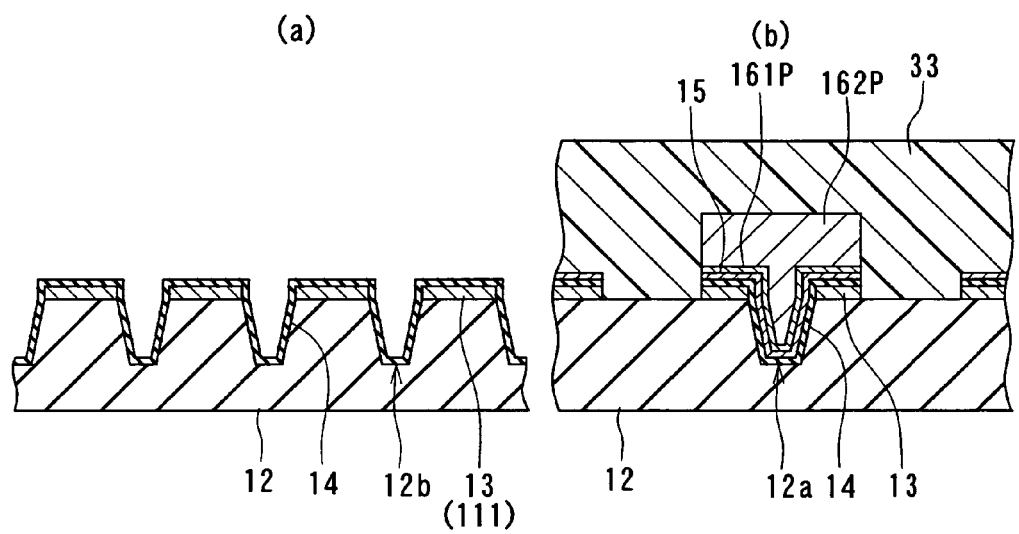
FIG. 12 is a cross-sectional view of the layered structure obtained in a step that follows the step shown in FIG. 11.

FIG. 12 illustrates the following step. FIG. 12 shows cross sections of the layered structure obtained in a step that follows the step illustrated in FIG. 11. FIG. 12(a) shows the cross section in the region in which the indicator section 110 is located. FIG. 12(b) shows the cross section in the region in which the pole layer 16 is located. In the step, first, a mask 33 made of photoresist, for example, is formed to cover the top surface of the layered structure except a portion in which the indicator section 110 is located. Next, a portion of the polishing stopper layer 15 that is not covered with the mask 33 is removed by etching.

Figure 13:
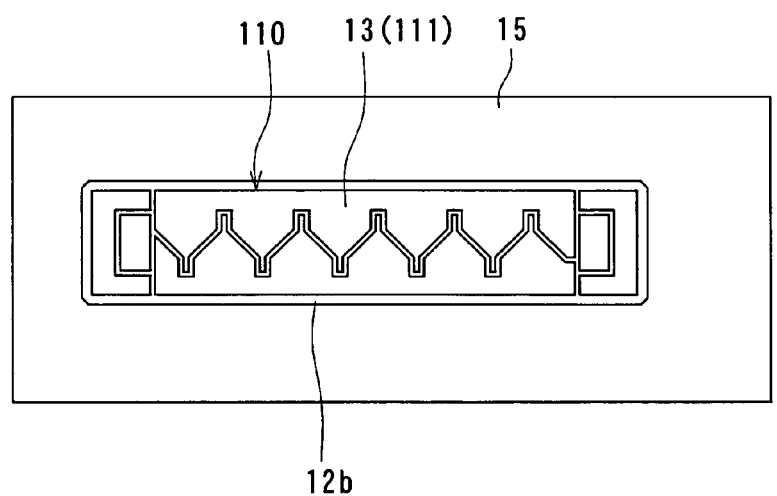
FIG. 13 is a top view illustrating an indicator section and a neighborhood thereof after the step shown in FIG. 12 is completed.

FIG. 13 is a top view of the indicator section 110 and a neighborhood thereof after the step shown in FIG. 12 is completed. In FIG. 13, the nonmagnetic film 14 is omitted for convenience. As shown in FIG. 13, the indicator section 110 is not covered with the polishing stopper layer 15 but the stopper layer 15 remains around the indicator section 110.

In the manner thus described, in the indicator section 110, portions of the first magnetic layer 161P, the second magnetic layer 162P and the polishing stopper layer 15 that are located around the nonmagnetic conductive layer 13 to be the indicator layer 111 are removed. As a result, it is possible to obtain a clear image of the indicator layer 111 when the indicator layer 111 exposed in the medium facing surface 30 is observed with an electron microscope. Depending on the resolution of the electron microscope, there are some cases in which a clear image of the indicator layer 111 is obtained with the microscope without removing the portion of the second magnetic layer 162P in the groove 12b. In such cases, it is unnecessary to remove the portion of the second magnetic layer 162P located in the groove 12b.

Figure 14:
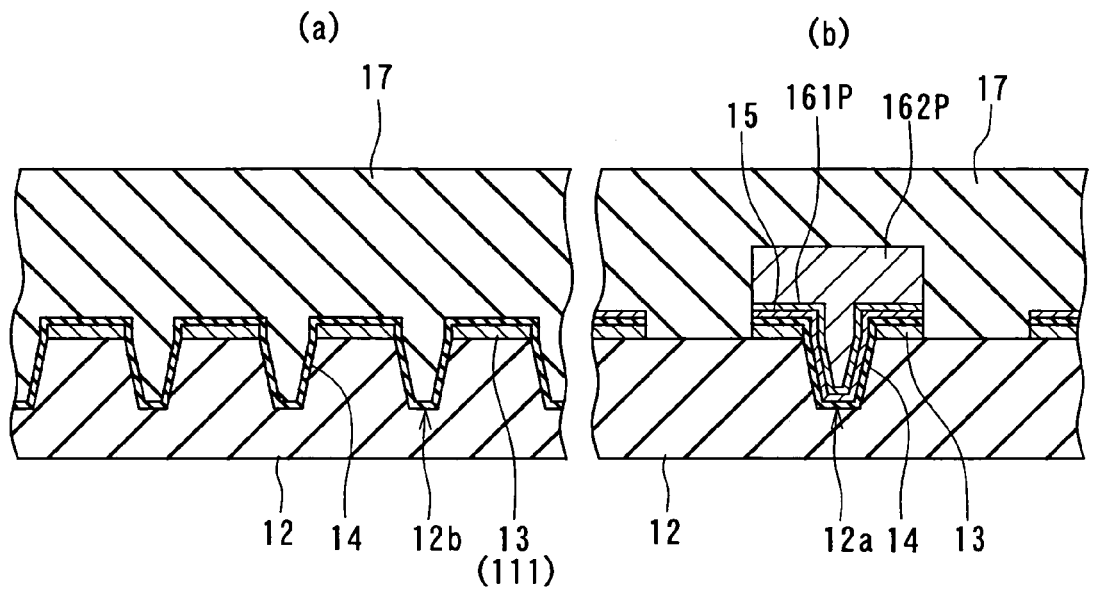
FIG. 14 is a cross-sectional view of the layered structure obtained in a step that follows the step shown in FIG. 12.

FIG. 14 illustrates the following step. FIG. 14 shows cross sections of the layered structure obtained in a step that follows the step illustrated in FIG. 12. FIG. 14(a) shows the cross section in the region in which the indicator section 110 is located. FIG. 14(b) shows the cross section in the region in which the pole layer 16 is located. In the step, the insulating layer 17 having a thickness of 0.5 to 1.5 μm, for example, is formed on the entire top surface of the layered structure.

Figure 15:
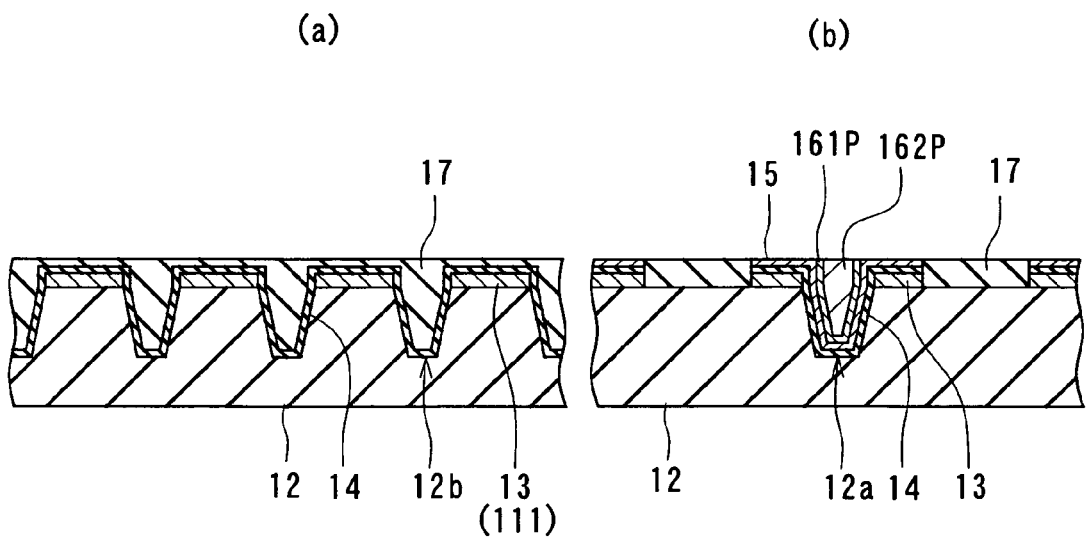
FIG. 15 is a cross-sectional view of the layered structure obtained in a step that follows the step shown in FIG. 14.

FIG. 15 illustrates the following step. FIG. 15 shows cross sections of the layered structure obtained in a step that follows the step illustrated in FIG. 14. FIG. 15(a) shows the cross section in the region in which the indicator section 110 is located. FIG. 15(b) shows the cross section in the region in which the pole layer 16 is located. In the step, the insulating layer 17, the second magnetic layer 162P and the first magnetic layer 161P are polished by CMP, for example, until the polishing stopper layer 15 is exposed. The top surfaces of the polishing stopper layer 15, the insulating layer 17, the first magnetic layer 161P and the second magnetic layer 162P are thereby flattened. If the polishing stopper layer 15, the insulating layer 17, the second magnetic layer 162P and the first magnetic layer 161P are polished by CMP, such a slurry is used that polishing is stopped when the polishing stopper layer 15 is exposed, such as an alumina-base slurry.

Figure 16:
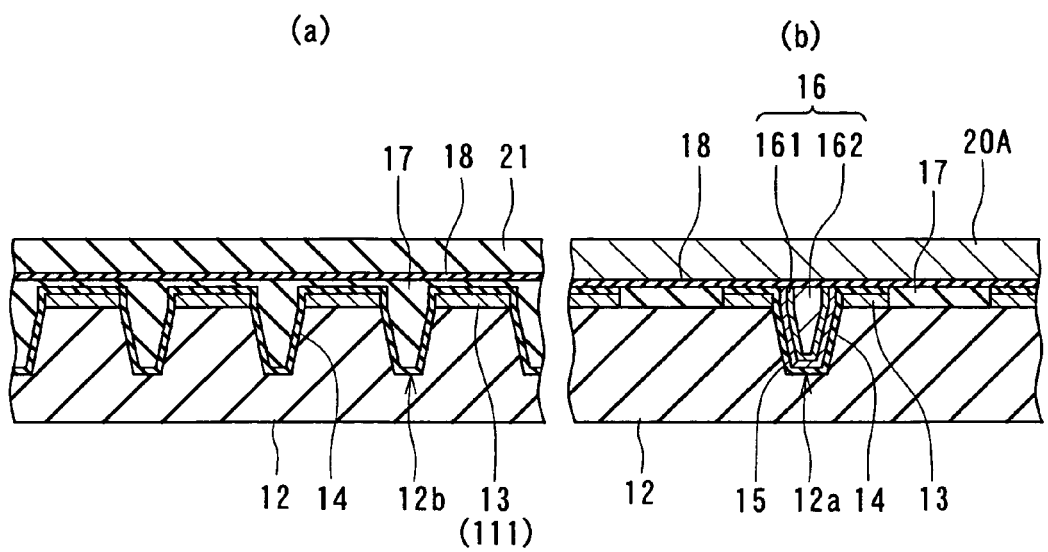
FIG. 16 is a cross-sectional view of the layered structure obtained in a step that follows the step shown in FIG. 15.

FIG. 16 illustrates the following step. FIG. 16 shows cross sections of the layered structure obtained in a step that follows the step illustrated in FIG. 15. FIG. 16(a) shows the cross section in the region in which the indicator section 110 is located. FIG. 16(b) shows the cross section in the region in which the pole layer 16 is located. In the step, first, ion beam etching, for example, is performed to remove a portion of the polishing stopper layer 15 located above the nonmagnetic conductive layer 13 and to etch portions of the first magnetic layer 161P and the second magnetic layer 162P. The top surfaces of the nonmagnetic film 14, the polishing stopper layer 15, the first magnetic layer 161P and the second magnetic layer 162P are thereby flattened. The magnetic layers 161P and 162P are thereby formed into the first layer 161 and the second layer 162, respectively.

Next, the gap layer 18 is formed on the entire top surface of the layered structure. The gap layer 18 is formed by sputtering or CVD, for example. If the gap layer 18 is formed by CVD, it is preferred to employ ALCVD. If the gap layer 18 is formed by ALCVD, it is preferred that the gap layer 18 be made of alumina.

Next, the first layer 20A is formed on the gap layer 18, and the yoke layer 20B is formed on the pole layer 16. The first layer 20A and the yoke layer 20B may be formed by frame plating or by making a magnetic layer through sputtering and then selectively etching the magnetic layer. Selective etching of the magnetic layer may be performed by, for example, making an alumina layer on the magnetic layer, making a mask on the alumina layer by frame plating, and etching the alumina layer and the magnetic layer using the mask. Next, the nonmagnetic layer 21 is formed on the entire top surface of the layered structure. Next, the nonmagnetic layer 21 is polished by CMP, for example, so that the first layer 20A and the yoke layer 20B are exposed, and the top surfaces of the first layer 20A, the yoke layer 20B and the nonmagnetic layer 21 are flattened.

Figure 17:
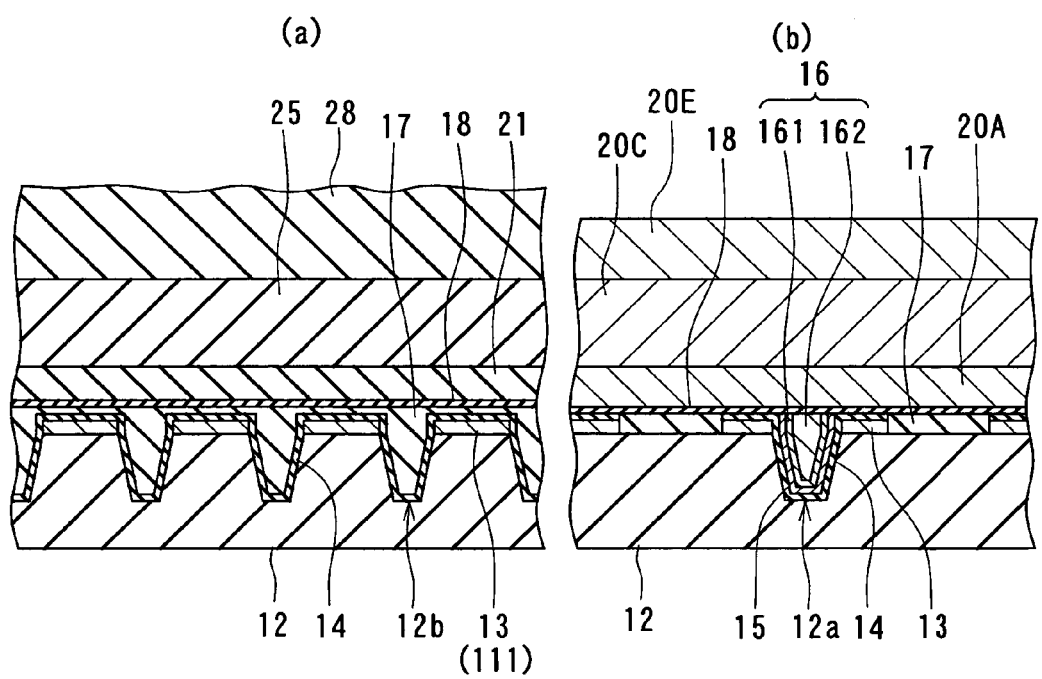
FIG. 17 is a cross-sectional view of the layered structure obtained in a step that follows the step shown in FIG. 16.

FIG. 17 illustrates the following step. FIG. 17 shows cross sections of the layered structure obtained in a step that follows the step illustrated in FIG. 16. FIG. 17(a) shows the cross section in the region in which the indicator section 110 is located. FIG. 17(b) shows the cross section in the region in which the pole layer 16 is located. In the step, first, the insulating layer 22 is formed on regions of the top surfaces of the yoke layer 20B and the nonmagnetic layer 21 in which the coil 23 will be disposed, as shown in FIG. 5. Next, the coil 23 is formed by frame plating, for example, such that at least part of the coil 23 is disposed on the insulating layer 22. Next, the second layer 20C and the coupling layer 20D are formed by frame plating, for example. Alternatively, the coil 23 may be formed after the second layer 20C and the coupling layer 20D are formed.

Next, the insulating layer 24 made of photoresist, for example, is selectively formed around the coil 23 and in the space between the respective adjacent turns of the coil 23. Next, the insulating layer 25 having a thickness of 4 to 4.5 µm, for example, is formed on the entire top surface of the layered structure. Next, the insulating layer 25 is polished by CMP, for example, so that the second layer 20C, the coupling layer 20D and the coil 23 are exposed, and the top surfaces of the second layer 20C, the coupling layer 20D, the coil 23 and the insulating layers 24 and 25 are thereby flattened.

Next, the insulating layer 26 is formed on the coil 23 and the insulating layer 24. Next, the third layer 20E is formed by frame plating, for example, to complete the shield layer 20. Next, the protection layer 28 is formed to cover the entire top surface of the layered structure. Wiring and terminals are then formed on the protection layer 28, the substrate is cut into sliders, and the steps including polishing of the medium facing surface 30 and fabrication of flying rails are performed. The magnetic head is thus completed.

In such a manner, components of a plurality of magnetic heads including a plurality of sets of the pole layer 16 and the coil 23 are formed on the single substrate 1. The magnetic head substructure is thus fabricated in which a plurality of rows of pre-head portions that will be the magnetic heads later are aligned. The magnetic head substructure is cut in a neighborhood of the imaginary surface ABS. A surface formed by cutting the magnetic head substructure is polished to form the medium facing surfaces 30. Furthermore, a plurality of pre-head portions are separated from one another by cutting the substructure, and a plurality of magnetic heads are thereby fabricated.

An example of the step of fabricating a plurality of magnetic heads by cutting the magnetic head substructure will now be described. In this example, first, the substructure is cut at the positions in the inter-row portions 102 shown in FIG. 1 or FIG. 2 to form head aggregates each of which includes a row of a plurality of pre-head portions 101. Next, a surface (the surface closer to the imaginary surface ABS) formed in each of the head aggregates by cutting the substructure is polished (lapped) to form the medium facing surfaces 30 of the pre-head portions 101 that the head aggregate includes. Next, flying rails are formed by etching, for example, in the medium facing surfaces 30. The head aggregate is then cut at the locations of the intra-row portions 103 to be removed that are shown in FIG. 1 or FIG. 2, so that the pre-head portions 101 are separated from one another to thereby obtain a plurality of magnetic heads.

In the step of forming the medium facing surfaces 30 by lapping the head aggregate, for example, the surface formed by cutting the substructure is lapped to form the medium facing surfaces 30, while the resistance values of the MR elements 5 that the head aggregate includes are monitored, so that the resistance of each of the MR elements 5 is of a specific value. As a result, the MR height, the throat height TH and the neck height NH of each of the pre-head portions 101 are controlled to be of respective desired values.

The specific details of the step of fabricating the magnetic heads by cutting the magnetic head substructure are not limited to the foregoing example. For example, the magnetic heads may be fabricated in the following manner. First, the magnetic head substructure is cut to fabricate a first head aggregate including a plurality of rows of pre-head portions 101. Next, a surface of the first head aggregate is lapped to form the medium facing surfaces 30 of a row of pre-head portions 101. Next, the first head aggregate is cut so that the row of pre-head portions 101 in which the medium facing surfaces 30 have been formed is separated to be a second head aggregate. Next, the second head aggregate is cut so that the pre-head portions 101 are separated from one another to thereby obtain a plurality of magnetic heads.

Consideration will now be given to a case in which the indicator sections 110 are not provided in the magnetic head substructure, and the medium facing surfaces 30 are formed while monitoring the resistance values of the MR elements 5 only. In this case, it is possible to form the medium facing surfaces 30 so that the MR height of each of the pre-head portions 101 is of a desired value. In this case, however, if the angle formed between each of the medium facing surfaces 30 and the top surface of the substrate 1 is other than a desired angle such as 90 degrees, a portion of the medium facing surface 30 in which the end face of the track width defining portion 16A is exposed is located out of a desired location even though a portion of the medium facing surface 30 in which the end of the MR element 5 is exposed is located at a desired location. As a result, the throat height TH and the neck height MH are other than desired values.

The magnetic head substructure of the embodiment comprises the indicator sections 110. Each of the indicator sections 110 includes the first indicator 121 and the second indicator 122. The widths of the first and second indicators 121 and 122 are equal at the target location of the medium facing surface 30, and one of the widths of the first and second indicators 121 and 122 decreases while the other increases with shifts in position along the direction orthogonal to the medium facing surface 30. As a result, according to the embodiment, it is possible to know whether the medium facing surfaces 30 are formed at the target location by observing the widths of the first and second indicators 121 and 122 taken in the medium facing surface 30 in the step of fabricating the magnetic heads. Furthermore, according to the embodiment, when the medium facing surfaces 30 are formed by lapping the surface formed by cutting the substructure, the closer the lapped surface to the target location of the medium facing surfaces 30, the smaller is the difference between the widths of the first and second indicators 121 and 122 in the lapped surface. Therefore, it is easy to know whether the medium facing surfaces 30 are close to the target location by observing the widths of the first and second indicators 121 and 122 in the lapped surface. Because of these features, the embodiment makes it possible to form the medium facing surfaces 30 at a desired level.

According to the embodiment, as the equation (1) indicates, the difference between the widths of the first and second indicators 121 and 122 at a deviating position DP that deviates from the target location of the medium facing surfaces 30 in the direction orthogonal to the medium facing surfaces 30 is proportional to the amount of deviation of the deviating position DP from the target location of the medium facing surfaces 30. Therefore, according to the embodiment, when the medium facing surfaces 30 are formed by lapping the surface formed by cutting the substructure, the amount of deviation of the lapped surface from the target location of the medium facing surfaces 30 can be determined from the difference between the widths of the first and second indicators 121 and 122 taken in the lapped surface. As a result, it is possible to form the medium facing surfaces 30 at a desired location with higher accuracy.

According to the embodiment, the medium facing surfaces 30 are formed while monitoring both of the resistances of the MR elements 5 and the widths of the first and second indicators 121 and 122, so that a desired angle such as 90 degrees is formed between each of the medium facing surfaces 30 and the top surface of the substrate 1. It is thereby possible to control the MR height, the throat height TH and the neck height HN to be of respective desired values.

If the indicator sections 110 are located in such regions that portions thereof will remain in the magnetic heads, in each of the magnetic heads the amount of deviation of the medium facing surface 30 from the target location thereof can be determined from the difference between the widths of the first and second indicators 121 and 122 taken in the medium facing surface 30.

Figure 19:
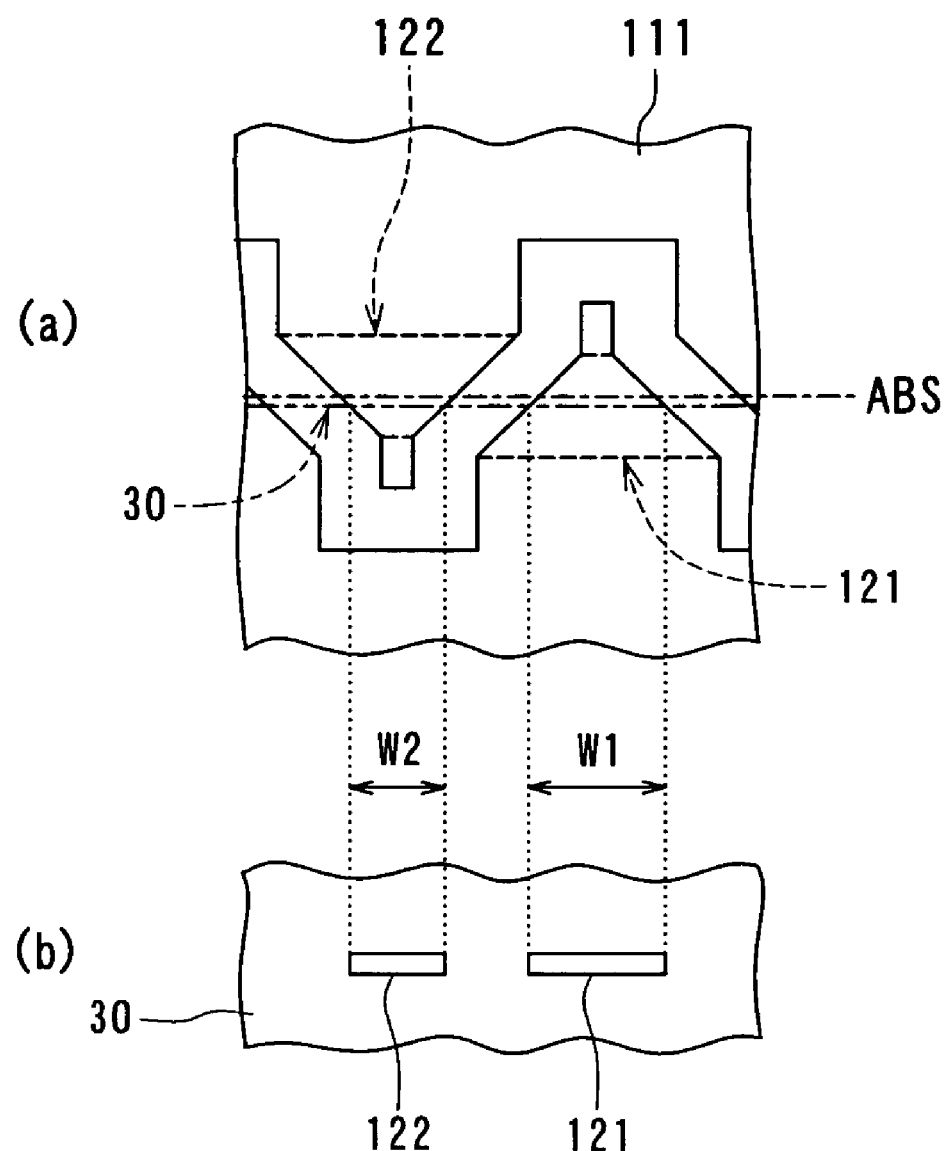
FIG. 19 is a view for illustrating a part of the indicator section of the first embodiment of the invention.
Figure 20:
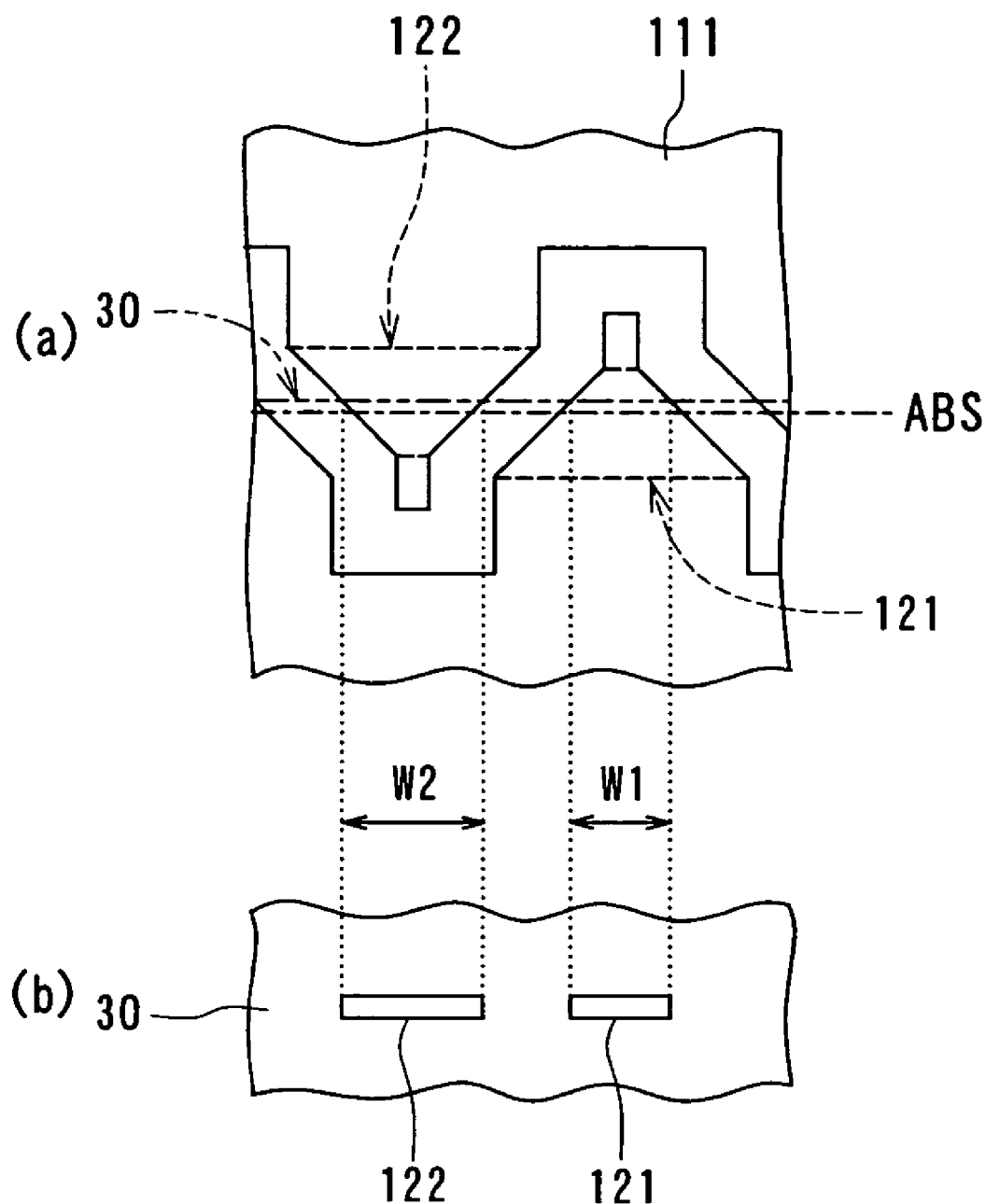
FIG. 20 is a view for illustrating a part of the indicator section of the first embodiment of the invention.

Reference is now made to FIG. 18 to FIG. 20 to describe the relationship between the location of the medium facing surface 30 and the widths of the indicators 121 and 122 taken in the medium facing surface 30. FIG. 19 and FIG. 20 are views showing a portion of the indicator section 110 as is FIG. 18. FIG. 19(a) and FIG. 20(a) show a portion of the indicator section 110 seen from above. FIG. 19(b) and FIG. 20(b) show the medium facing surface 30.

If the medium facing surface 30 is formed at the target location, the width W1 of the first indicator 121 and the width W2 of the second indicator 122 taken in the medium facing surface 30 are equal, as shown in FIG. 18(b).

FIG. 19 illustrates a case in which the amount of lapping of the medium facing surface 30 is less than required and the medium facing surface 30 thereby deviates from the target location. In this case, as shown in FIG. 19(b), the width W1 of the first indicator 121 taken in the medium facing surface 30 is greater than the width W2 of the second indicator 122. Therefore, the difference between the widths W1−W2 is of a positive value.

FIG. 20 illustrates a case in which the amount of lapping of the medium facing surface 30 is more than required and the medium facing surface 30 thereby deviates from the target location. In this case, as shown in FIG. 20(b), the width W1 of the first indicator 121 taken in the medium facing surface 30 is smaller than the width W2 of the second indicator 122. Therefore, the difference between the widths W1−W2 is of a negative value.

According to the embodiment, as can be seen from FIG. 18 to FIG. 20, when the difference between the widths W1−W2 is not zero, whether the difference is of a positive value or negative value indicates whether the medium facing surface 30 is situated forward or backward with respect to the target location. Furthermore, since the difference between the widths W1−W2 is proportional to the amount of deviation of the medium facing surface 30 from the target location, the amount of deviation thereof can be determined from the value of the difference between the widths W1−W2.

In the embodiment, each of the indicator sections 110 includes the reference portions 123. Each of the reference portions 123 has a width that is equal to the width of each of the first and second indicators 121 and 122 taken at the target location of the medium facing surface 30 and that does not change with shifts in position along the direction orthogonal to the medium facing surface 30. Consequently, if the medium facing surface 30 is formed at the target location, the widths of the first indicator 121, the second indicator 122 and the reference portions 123 that are taken in the medium facing surface 30 are all equal. On the other hand, if the medium facing surface 30 deviates from the target location thereof, one of the widths of the first and second indicators 121 and 122 taken in the medium facing surface 30 is smaller than the width of the reference portions 123 taken in the medium facing surface 30 while the other is greater than the width of the reference portions 123 taken in the medium facing surface 30. Because of these features, the embodiment makes it easy to determine whether the medium facing surface 30 is formed at the target location thereof.

According to the embodiment, the pole layer 16 is disposed in the groove 12a of the encasing layer 12 with the nonmagnetic film 14 and the polishing stopper layer 15 disposed between the pole layer 16 and the groove 12a. Therefore, the shape of the pole layer 16 is determined by the shape of the groove 12a. As thus described, according to the embodiment, since the side portions of the pole layer 16 are not etched, it is impossible that the neck height NH is greater than a desired value and/or the pole layer 16 is greatly out of a desired shape. Furthermore, according to the embodiment, it is possible to form the medium facing surface 30 at a desired location with accuracy as described above. Because of these features, it is possible to determine the track width with accuracy even if the neck height NH is small.

According to the embodiment, it is possible to form the pole layer 16 with accuracy that has a small width and a shape capable of preventing problems resulting from the skew.

According to the embodiment, the pole layer 16 is disposed in the groove 12a of the encasing layer 12 with the nonmagnetic film 14 and the polishing stopper layer 15 disposed between the pole layer 16 and the groove 12a. As a result, it is possible to reduce the width of the top surface of the track width defining portion 16A that defines the track width.

Modification Examples

Figure 21:
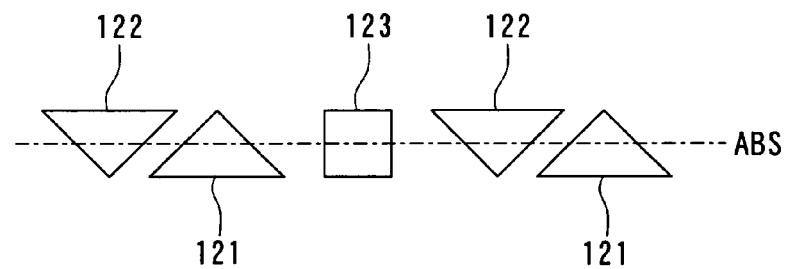
FIG. 21 is a view for illustrating first indicators, second indicators and a reference portion of a first modification example of the first embodiment of the invention.

First to third modification examples of the embodiment will now be described. FIG. 21 is a top view illustrating the first indicators, the second indicators and the reference portion of the first modification example. In the first modification example, each of the first and second indicators 121 and 122 has a shape of an isosceles triangle. In each of the first and second indicators 121 and 122, the base is located parallel to the imaginary surface ABS, and the base and the apex are located opposite to each other with the imaginary surface ABS located in between. However, the bases of the first and second indicators 121 and 122 are located opposite to each other with the imaginary surface ABS located in between. The widths of the first and second indicators 121 and 122 are equal at the target location of the medium facing surface 30, that is, in the imaginary surface ABS, and, one of the widths of the first and second indicators 121 and 122 decreases while the other increases with shifts in position along the direction orthogonal to the medium facing surface 30. In the first modification example, the reference portion 123 has a shape of a square. The reference portion 123 has a width that is equal to the width of each of the first and second indicators 121 and 122 taken at the target location of the medium facing surface 30 and that does not change with shifts in position along the direction orthogonal to the medium facing surface 30. The reference portion 123 is located at a position that intersects the imaginary surface ABS.

The first and second indicators 121 and 122 and the reference portion 123 are formed of the nonmagnetic conductive layer 13, for example. In the example shown in FIG. 21, a pair of the first and second indicators 121 and 122 are located on one of the sides of the reference portion 123, and another pair of the first and second indicators 121 and 122 are located on the other of the sides of the reference portion 123. However, the locations and the number of the first and second indicators 121 and 122 and the reference portion 123 are not limited to this example. The remainder of configuration, function and effect of the first modification example are similar to those of the embodiment described with reference to FIG. 1 to FIG. 20.

Figure 22:
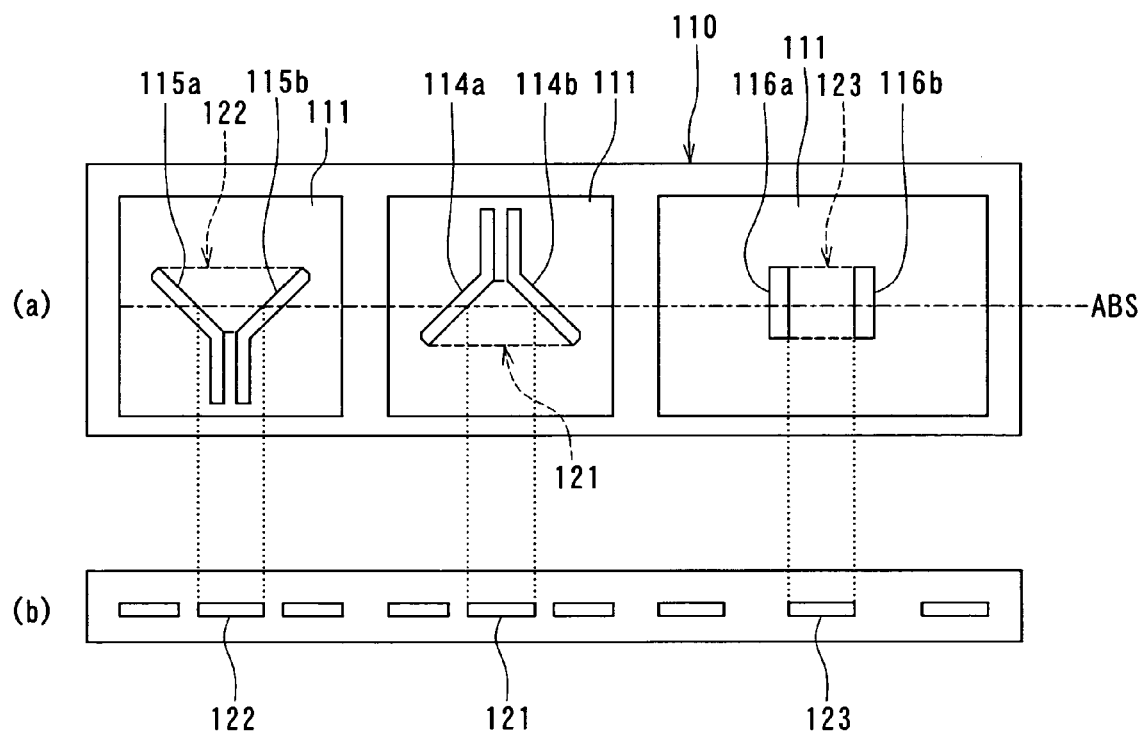
FIG. 22 is a view for illustrating an indicator section of a second modification example of the first embodiment of the invention.
Figure 23:
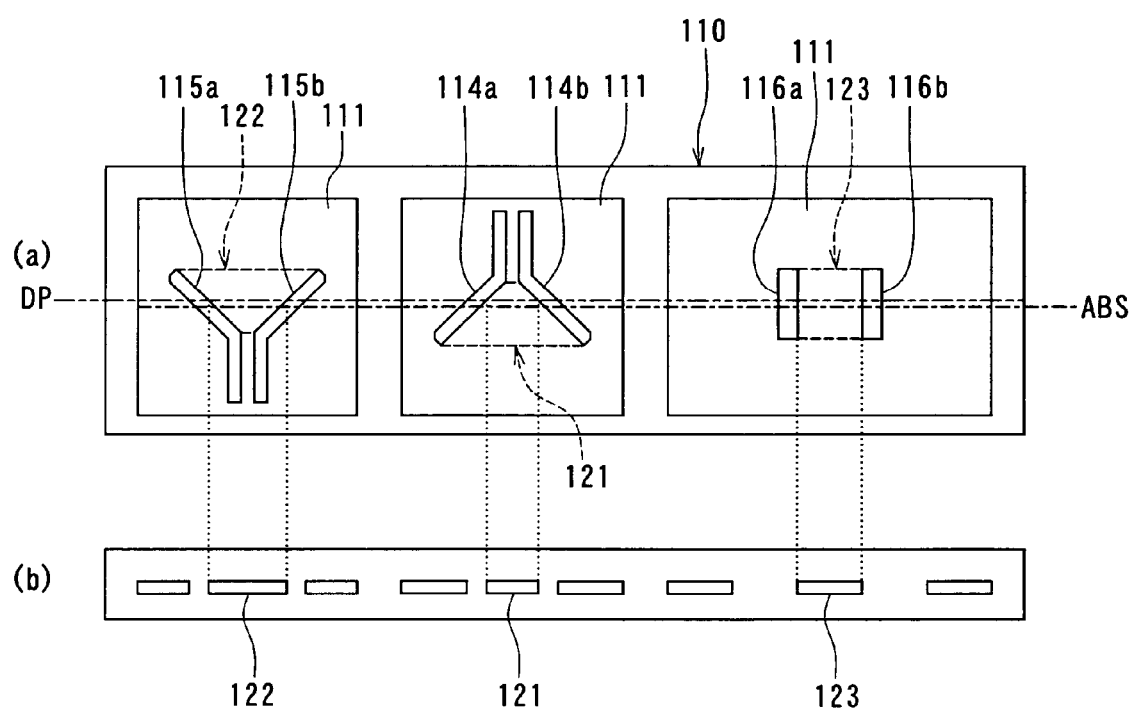
FIG. 23 is a view for illustrating the indicator section of the second modification example of the first embodiment of the invention.

FIG. 22 and FIG. 23 are views each illustrating the indicator section of the second modification example. FIG. 22(a) shows the indicator section seen from above. FIG. 22(b) shows the indicator section in the imaginary surface. FIG. 23(a) shows the indicator section seen from above. FIG. 23 (b) shows the indicator section in a displaced position.

In the second modification example, the first indicator 121 is formed of a region of the indicator layer 111 that is sandwiched between two long and narrow grooves 114a and 114b. The second indicator 122 is formed of a region of the indicator layer 111 that is sandwiched between two long and narrow grooves 115a and 115b. The reference portion 123 is formed of a region of the indicator layer 111 that is sandwiched between two long and narrow grooves 116a and 116b. The indicator layer 111 is formed of the nonmagnetic conductive layer 13, for example. Each of the first indicator 121, the second indicator 122 and the reference portion 123 is located in a position that intersects the imaginary surface ABS.

The widths of the first and second indicators 121 and 122 are equal at the target location of the medium facing surface 30, that is, in the imaginary surface ABS, and, one of the widths of the first and second indicators 121 and 122 decreases while the other increases with shifts in position along the direction orthogonal to the medium facing surface 30. The reference portion 123 has a width that is equal to the width of each of the first and second indicators 121 and 122 taken at the target location of the medium facing surface 30 and that does not change with shifts in position along the direction orthogonal to the medium facing surface 30. The remainder of configuration, function and effect of the second modification example are similar to those of the embodiment described with reference to FIG. 1 to FIG. 20.

Figure 24:
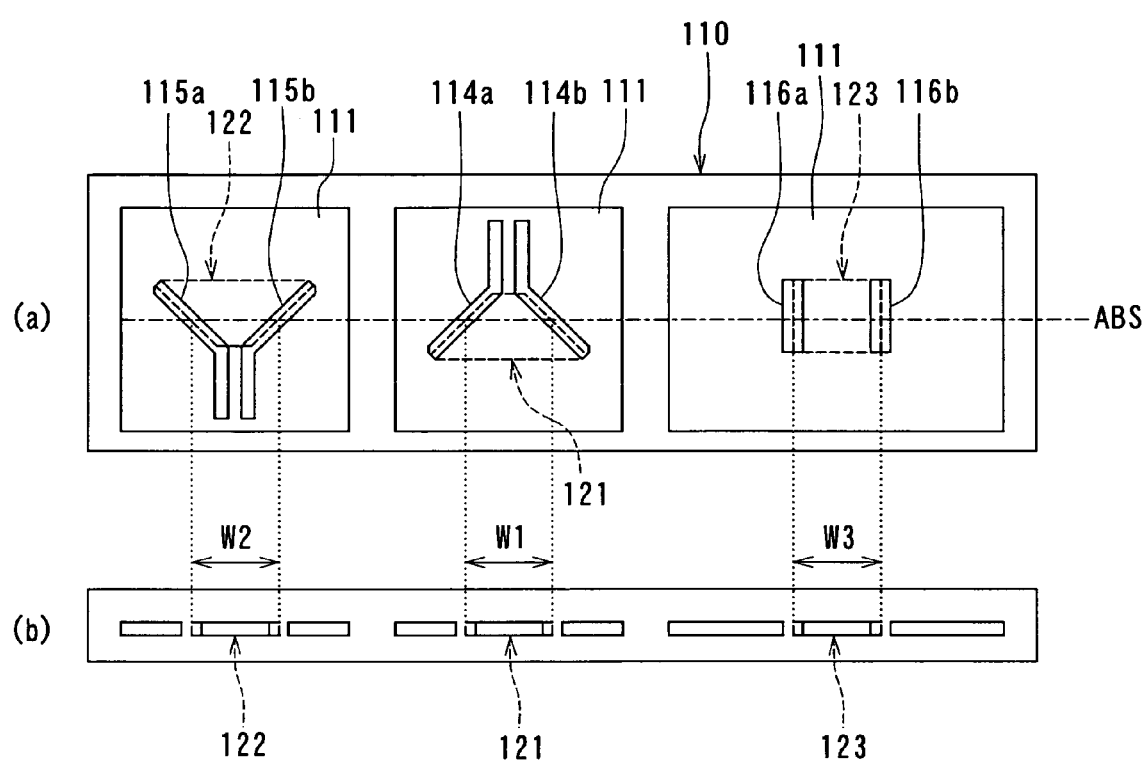
FIG. 24 is a view for illustrating an indicator section of a third modification example of the first embodiment of the invention.

FIG. 24 is a view illustrating the indicator section of the third modification example. FIG. 24(a) shows the indicator section seen from above. FIG. 24(b) shows the indicator section in the imaginary surface. In the third modification example, the shapes of the indicator layer 111 and the grooves 114a, 114b, 115a, 115b, 116a and 116b are the same as those of the second modification example. However, methods of defining the first indicator 121, the second indicator 122 and the reference portion 123 of the third modification example are different from those of the second modification example. That is, in the third modification example, the first indicator 121 is formed of a region sandwiched between a center line of the groove 114a extending in the longitudinal direction and a center line of the groove 114b extending in the longitudinal direction. The second indicator 122 is formed of a region sandwiched between a center line of the groove 115a extending in the longitudinal direction and a center line of the groove 115b extending in the longitudinal direction. The reference portion 123 is formed of a region sandwiched between a center line of the groove 116a extending in the longitudinal direction and a center line of the groove 116b extending in the longitudinal direction.

The widths of the first indicator 121, the second indicator 122 and the reference portion 123 are equal at the target location of the medium facing surface 30, that is, in the imaginary surface ABS. In the third modification example, even if the widths of the grooves 114a, 114b, 115a, 115b, 116a and 116b may vary depending on the level of precision of photolithography used for forming these grooves, the locations of the center lines of the grooves hardly vary. Therefore, the third modification example has an advantage that the widths of the first indicator 121, the second indicator 122 and the reference portion 123 hardly vary even if the widths of the grooves 114a, 114b, 115a, 115b, 116a and 116b may vary depending on the level of precision of photolithography. The remainder of configuration, function and effect of the third modification example are similar to those of the embodiment described with reference to FIG. 1 to FIG. 20.

Second Embodiment

Reference is now made to FIG. 25 to FIG. 29 to describe a magnetic head and a method of manufacturing the same, and a magnetic head substructure of a second embodiment of the invention. FIG. 25 to FIG. 29 are views illustrating an indicator section of the second embodiment. FIG. 25(a) to FIG. 29(a) illustrates the indicator section seen from above. FIG. 25(b), FIG. 26(b), FIG. 28(b) and FIG. 29(b) illustrate the indicator section at a deviating position. FIG. 27(b) illustrates the indicator section in the imaginary surface ABS.

The indicator section 110 of the second embodiment includes, in addition to the first indicator 121 and the second indicator 122, four pairs of a third indicator and a fourth indicator, that is, indicators 131 and 132, indicators 133 and 134, indicators 135 and 136, and indicators 137 and 138. The indicators 131, 133, 135 and 137 are the third indicators. The indicators 132, 134, 136 and 138 are the fourth indicators. The indicator section 110 of the second embodiment may further include the reference portion 123. The indicator section 110 of the second embodiment is formed of the indicator layer 111 and the indicator defining portion 112 as in the first embodiment.

The third and fourth indicators are located in such regions that portions of the third and fourth indicators are exposed in the medium facing surface when the medium facing surface is formed, and indicate a position that deviates from the target location of the medium facing surface in the direction orthogonal to the medium facing surface. The widths of the third and fourth indicators are equal at the position that deviates from the target location of the medium facing surface, and, one of the widths of the third and fourth indicators decreases while the other increases with shifts in position along the direction orthogonal to the medium facing surface.

In the second embodiment, a first position DP1, a second position DP2, a third position DP3 and a fourth position DP4 are defined as positions that deviate from the target location of the medium facing surface. In the step of forming the medium facing surfaces by lapping the surface formed by cutting the substructure, the first position DP1, the second position DP2, the imaginary surface ABS (the target location of the medium facing surface), the third position DP3, and the fourth position DP4 are exposed in this order in the lapped surface as lapping proceeds. The distance between the first position DP1 and the second position DP2, the distance between the second position DP2 and the imaginary surface ABS, the distance between the imaginary surface ABS and the third position DP3, and the distance between the third position DP3 and the fourth position DP4 may be either equal or different.

Figure 25:
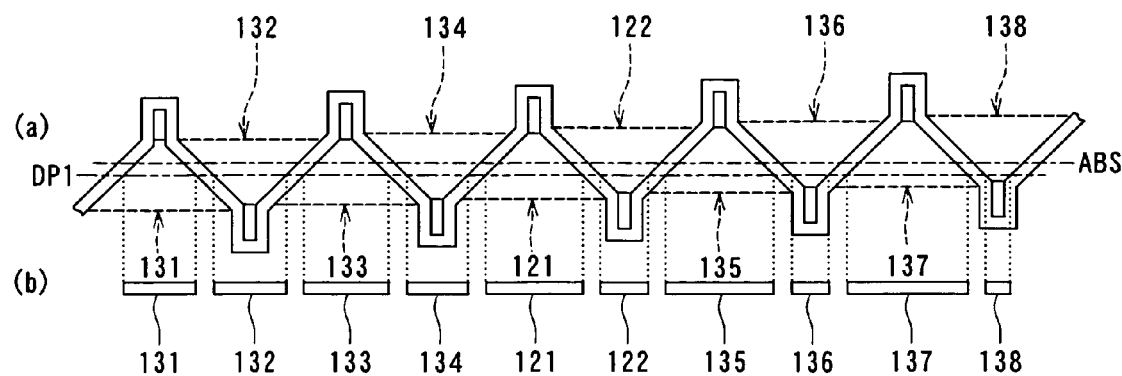
FIG. 25 is a view for illustrating an indicator section of a second embodiment of the invention.
Figure 26:
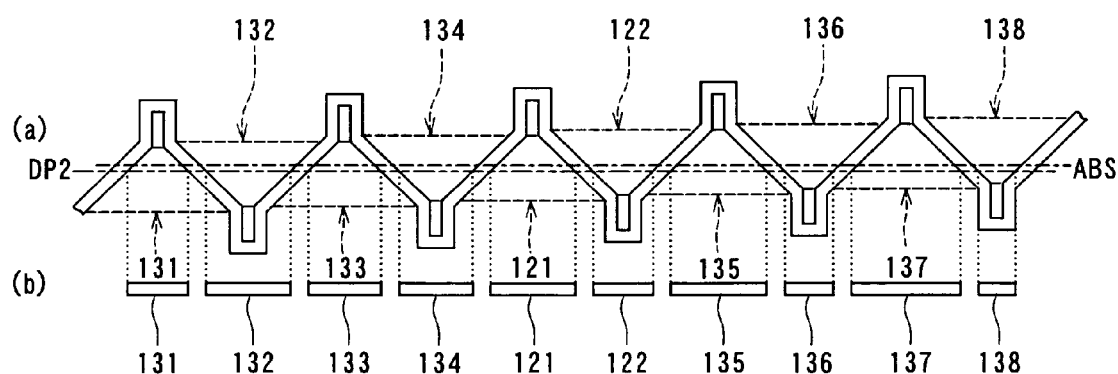
FIG. 26 is a view for illustrating the indicator section of the second embodiment of the invention.
Figure 27:
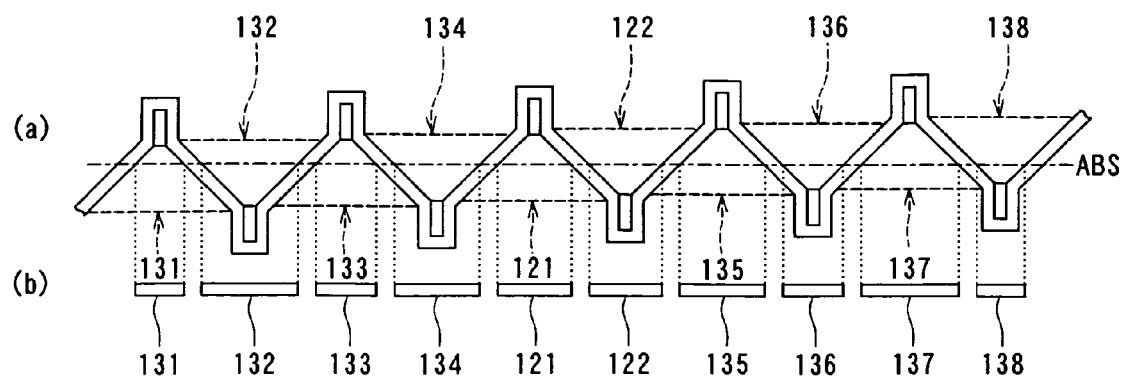
FIG. 27 is a view for illustrating the indicator section of the second embodiment of the invention.
Figure 28:
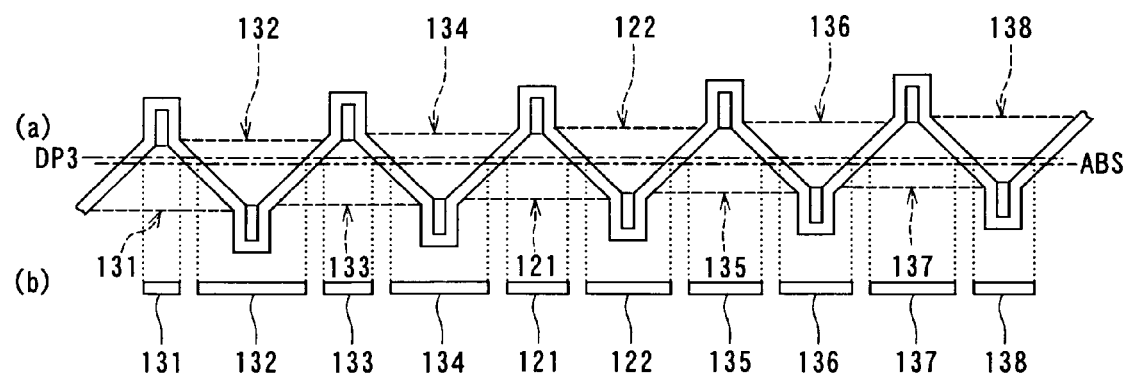
FIG. 28 is a view for illustrating the indicator section of the second embodiment of the invention.
Figure 29:
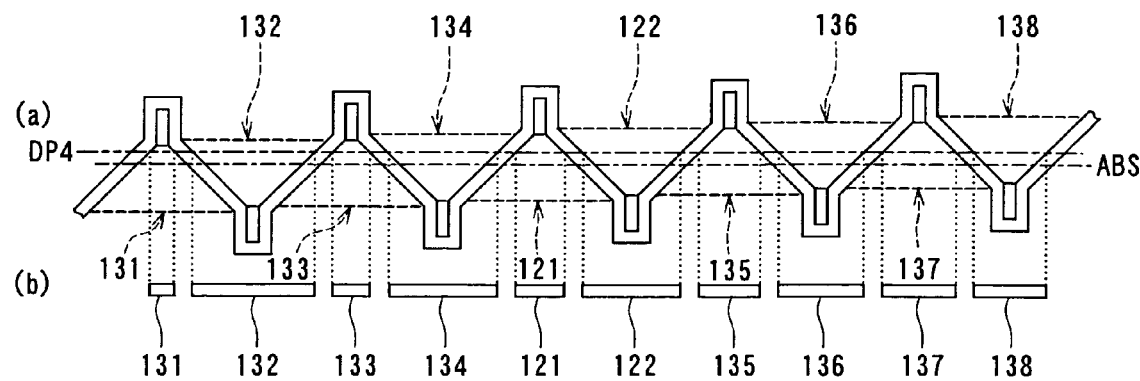
FIG. 29 is a view for illustrating the indicator section of the second embodiment of the invention.

As shown in FIG. 25, the widths of the indicators 131 and 132 taken at the first position DP1 are equal. As shown in FIG. 26, the widths of the indicators 133 and 134 taken at the second position DP2 are equal. As shown in FIG. 27, the widths of the indicators 121 and 122 taken in the imaginary surface ABS (the target location of the medium facing surface) are equal. As shown in FIG. 28, the widths of the indicators 135 and 136 taken at the third position DP3 are equal. As shown in FIG. 29, the widths of the indicators 137 and 138 taken at the fourth position DP4 are equal.

According to the second embodiment, in the step of forming the medium facing surfaces, it is easy to recognize an approximate amount of deviation of the lapped surface from the imaginary surface ABS (the target location of each of the medium facing surfaces) by observing the widths of the indicators in the lapped surface. That is, if the widths of the indicators 131 and 132 taken in the lapped surface are equal, it is known that the lapped surface is located at the first position DP1. If the widths of the indicators 133 and 134 taken in the lapped surface are equal, it is known that the lapped surface is located at the second position DP1. If the widths of the indicators 121 and 122 taken in the lapped surface are equal, it is known that the lapped surface is located at the target location. If the widths of the indicators 135 and 136 taken in the lapped surface are equal, it is known that the lapped surface is located at the third position DP3. If the widths of the indicators 137 and 138 taken in the lapped surface are equal, it is known that the lapped surface is located at the fourth position DP4. The amount of deviation of each of the positions DP1, DP2, DP3 and DP4 from the imaginary surface ABS (the target location of the medium facing surface) is known in advance. In addition, even if the lapped surface is not exactly located at any of the above-mentioned positions, it is easy through observing the widths of the indicators in the lapped surface to find which of the above-mentioned positions the lapped surface is close to. Furthermore, in the second embodiment, it is also possible to determine the amount of deviation of the lapped surface from the target location of the medium facing surface with accuracy, using the difference in width of the indicators 121 and 122, as in the first embodiment.

While FIG. 25 to FIG. 29 illustrate the example in which four pairs of the third and fourth indicators are provided, at least one pair of the third and fourth indicators is sufficient. The remainder of configuration, function and effect of the second embodiment are similar to those of the first embodiment including the modification examples.

Third Embodiment

Figure 30:
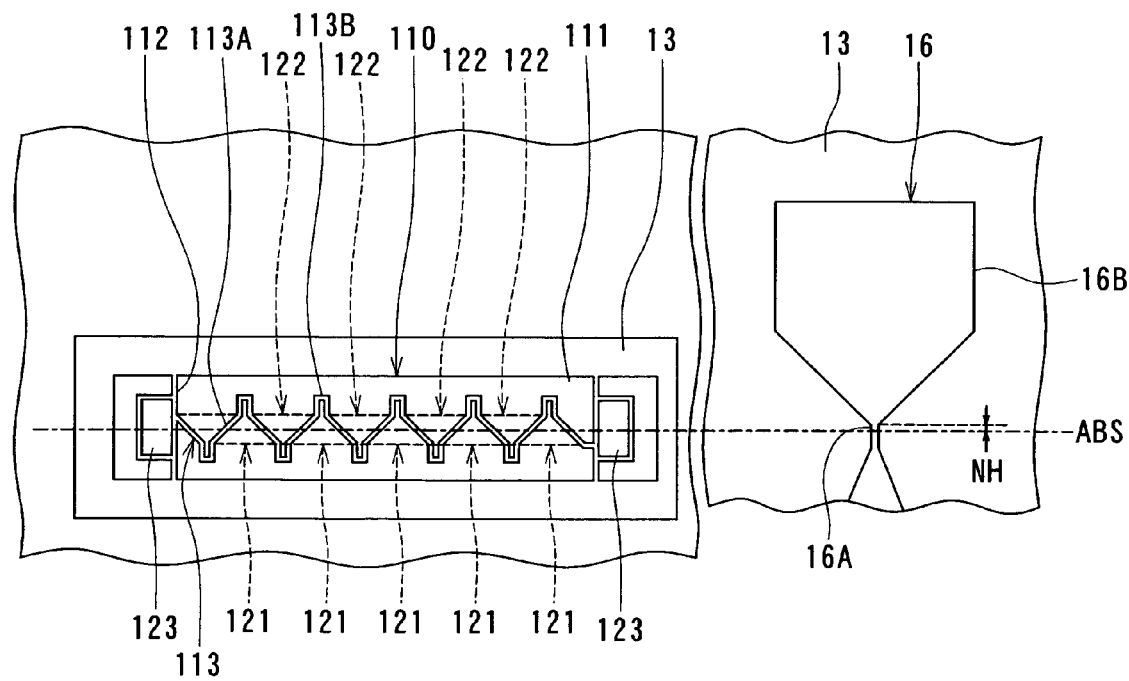
FIG. 30 is a top view of a main part of a magnetic head substructure of a third embodiment of the invention.
Figure 31:
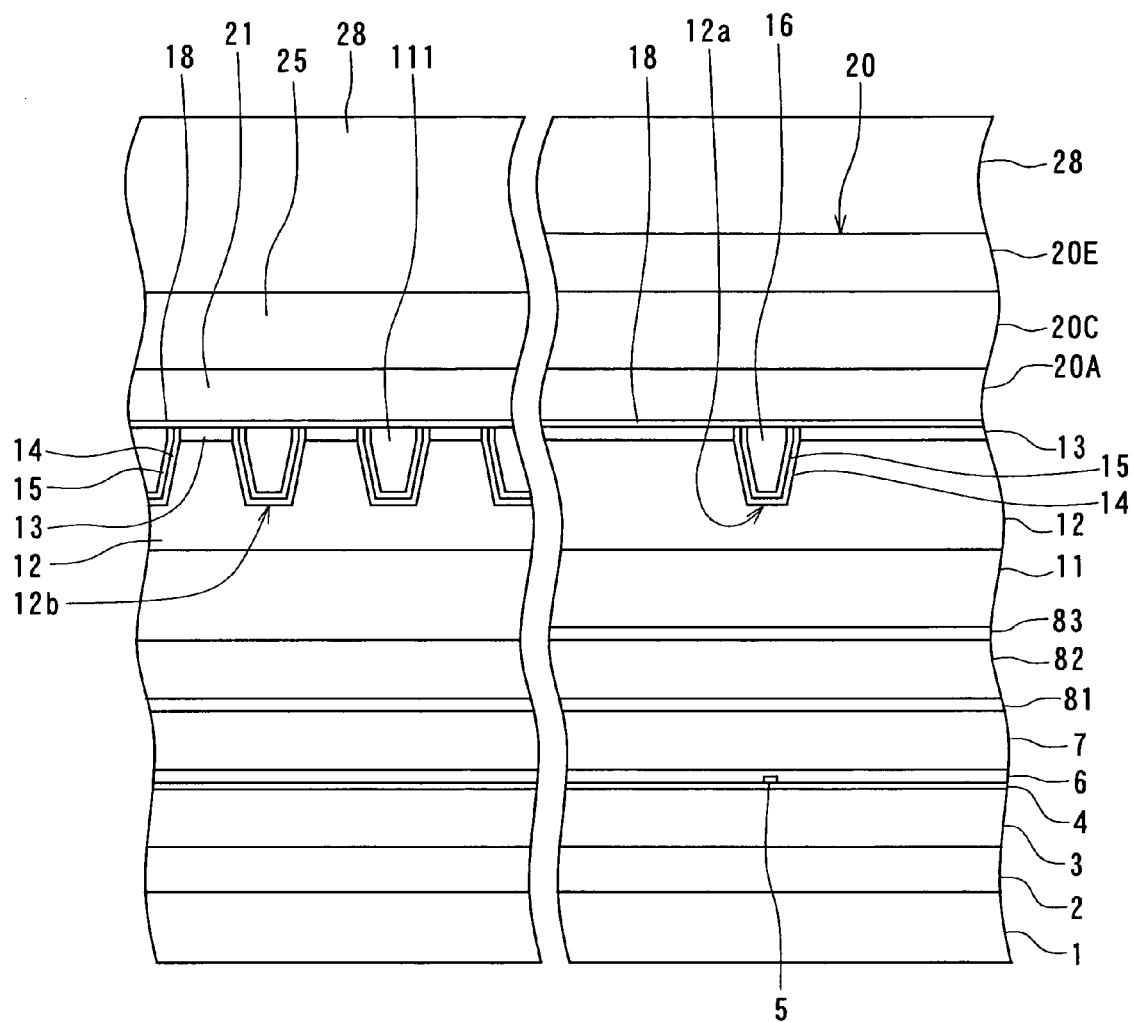
FIG. 31 is a front view of the medium facing surface of a magnetic head of the third embodiment of the invention.

A magnetic head and a method of manufacturing the same, and a magnetic head substructure of a third embodiment of the invention will now be described. FIG. 30 is a top view of a main part of the magnetic head substructure of the third embodiment. FIG. 31 is a front view of the medium facing surface of the magnetic head of the third embodiment. In the third embodiment, the indicator layer 111 that forms the first indicators 121, the second indicators 122 and the reference portions 123 is not a portion of the nonmagnetic conductive layer 13 but is made of a material the same as the material of the pole layer 16. The indicator defining portion 112 is formed of a portion of the nonmagnetic conductive layer 13. As shown in FIG. 30, the nonmagnetic conductive layer 13 is disposed around the indicator section 110. As shown in FIG. 31, the encasing layer 12 incorporates the groove 12a that accommodates the pole layer 16, and the groove 12b that accommodates the indicator layer 111.

Reference is now made to FIG. 32 to FIG. 37 to describe the steps of fabricating the magnetic head substructure of the third embodiment in detail. The steps up to the step of forming the nonmagnetic conductive layer 13 on the nonmagnetic layer 12P of the third embodiment are the same as those of the first embodiment.

Figure 32:
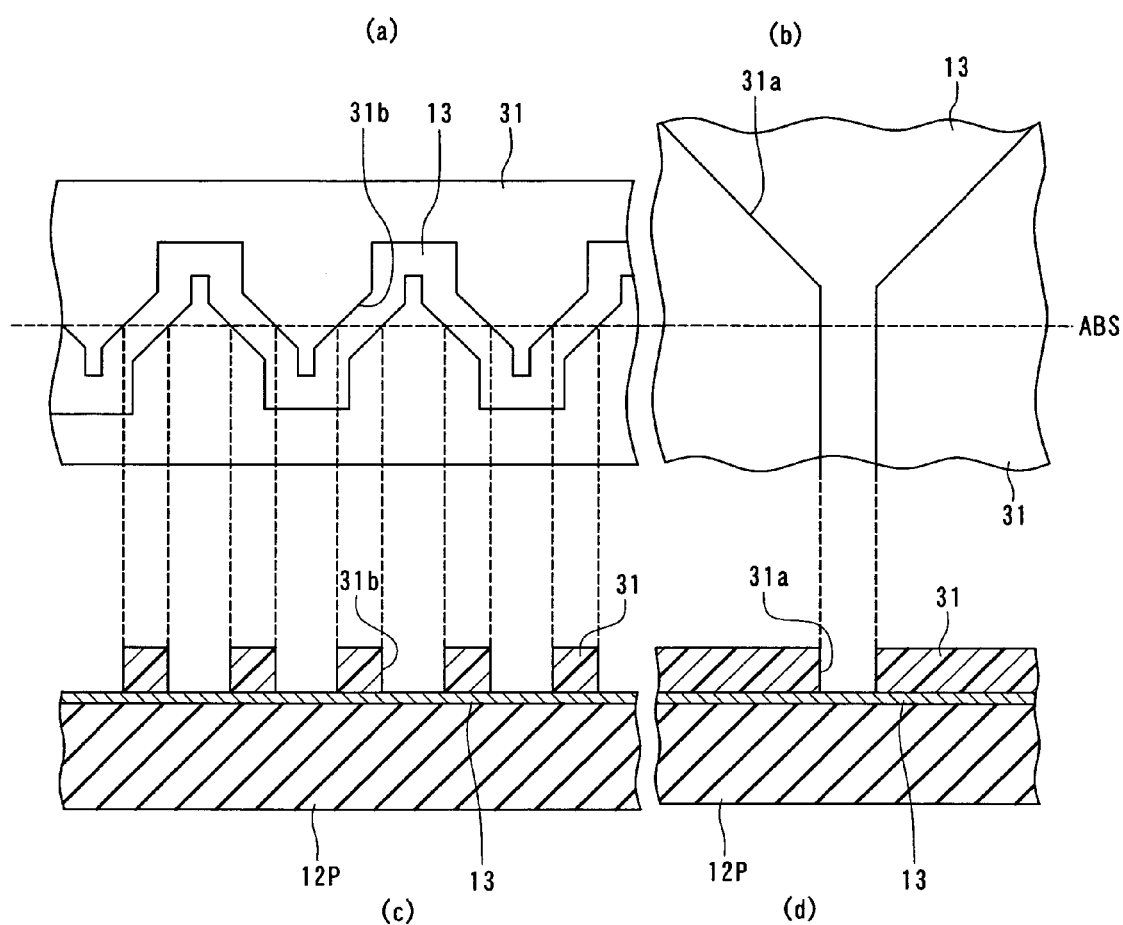
FIG. 32 is a view for illustrating a step of a method of manufacturing the magnetic head of the third embodiment of the invention.

FIG. 32 illustrates the following step. FIG. 32 shows top surfaces and cross sections of the layered structure obtained in the course of manufacturing process of the magnetic head. FIG. 32(a) shows the top surface in the region in which the indicator section 110 is located. FIG. 32 (b) shows the top surface in the region in which the pole layer 16 is located. FIG. 32(c) shows the cross section in the region in which the indicator section 110 is located. FIG. 32(d) shows the cross section in the region in which the pole layer 16 is located. In the step, a photoresist layer having a thickness of 1.0 μm, for example, is formed on the nonmagnetic conductive layer 13. The photoresist layer is then patterned to form the mask 31 for patterning the nonmagnetic conductive layer 13. The mask 31 has the opening 31a having a shape corresponding to the groove 12a, and the opening 31b having a shape corresponding to the groove 12b.

Figure 33:
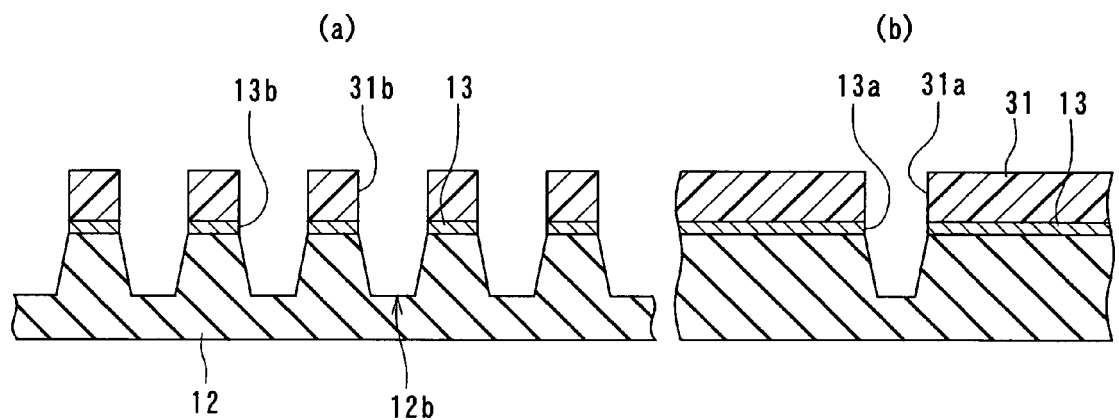
FIG. 33 is a cross-sectional view of the layered structure obtained in a step that follows the step shown in FIG. 32.

FIG. 33 illustrates the following step. FIG. 33 shows cross sections of the layered structure obtained in a step that follows the step illustrated in FIG. 32. FIG. 33(a) shows the cross section in the region in which the indicator section 110 is located. FIG. 33(b) shows the cross section in the region in which the pole layer 16 is located. In the step, first, the nonmagnetic conductive layer 13 is selectively etched by using the mask 31. The penetrating openings 13a and 13b are thereby formed in the nonmagnetic conductive layer 13. The opening 13a is formed in a region corresponding to the opening 31a of the mask 31 and has a shape corresponding to the plane geometry of the pole layer 16 to be formed later. The opening 13b is formed in a region corresponding to the opening 31b of the mask 31.

Furthermore, in the step shown in FIG. 33, portions of the nonmagnetic layer 12P exposed from the openings 13a and 13b of the nonmagnetic conductive layer 13 are selectively etched. As a result, the grooves 12a and 12b are formed in the nonmagnetic layer 12P in the regions corresponding to the openings 13a and 13b, respectively. The nonmagnetic layer 12P is formed into the encasing layer 12 by forming the grooves 12a and 12b therein. Next, the mask 31 is removed. The method of etching each of the nonmagnetic conductive layer 13 and the nonmagnetic layer 12P is the same as that of the first embodiment.

Figure 34:
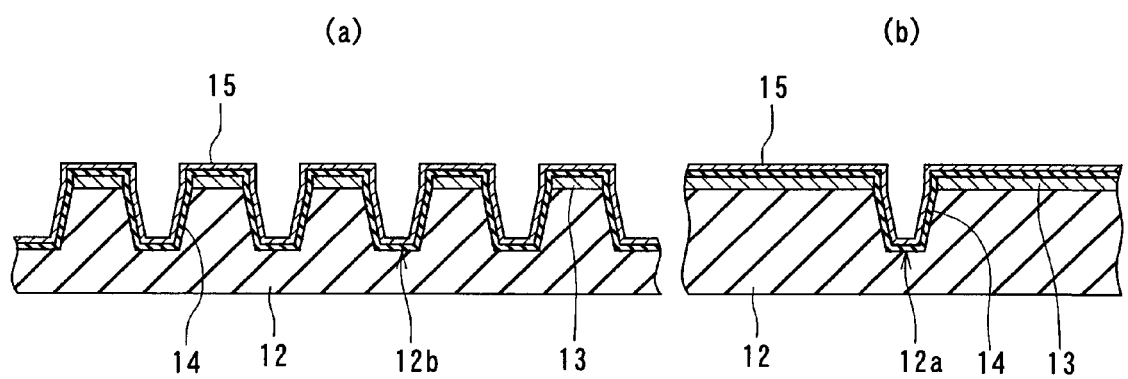
FIG. 34 is a cross-sectional view of the layered structure obtained in a step that follows the step shown in FIG. 33.

FIG. 34 illustrates the following step. FIG. 34 shows cross sections of the layered structure obtained in the step that follows the step illustrated in FIG. 33. FIG. 34(a) shows the cross section in the region in which the indicator section 110 is located. FIG. 34(b) shows the cross section in the region in which the pole layer 16 is located. In the step, first, the nonmagnetic film 14 is formed on the entire top surface of the layered structure. The nonmagnetic film 14 is formed in the grooves 12a and 12b, too. The method of forming the nonmagnetic film 14 is the same as that of the first embodiment. Next, the polishing stopper layer 15 is formed by sputtering or ALCVD, for example, on the entire top surface of the layered structure. The polishing stopper layer 15 is formed in the grooves 12a and 12b, too. The polishing stopper layer 15 indicates the level at which polishing to be performed later is stopped.

Figure 35:
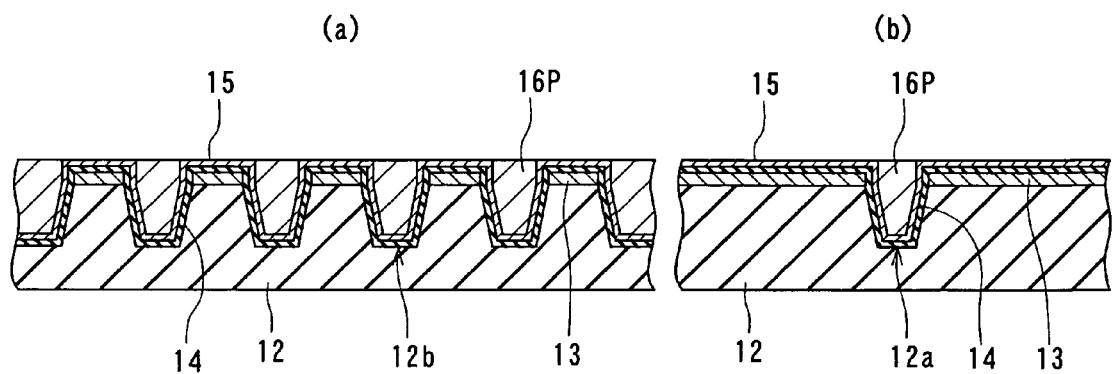
FIG. 35 is a cross-sectional view of the layered structure obtained in a step that follows the step shown in FIG. 34.

FIG. 35 illustrates the following step. FIG. 35 shows cross sections of the layered structure obtained in a step that follows the step illustrated in FIG. 34. FIG. 35(a) shows the cross section in the region in which the indicator section 110 is located. FIG. 35(b) shows the cross section in the region in which the pole layer 16 is located. In the step, first, the first magnetic layer 161P and the second magnetic layer 162P are formed one by one in a manner the same as that of the first embodiment. In FIG. 35, the combination of the first and second magnetic layers 161P and 162P is shown as a magnetic layer 16P. In the following description, too, the combination of the first and second magnetic layers 161P and 162P will be called the magnetic layer 16P. Next, although not shown, ion beam etching, for example, is performed to remove the first magnetic layer 161P except a portion thereof located below the second magnetic layer 162P. As mentioned in the first embodiment, it is not always necessary to form the first magnetic layer 161P.

Next, an insulating layer not shown having a thickness of 0.5 to 1.5 µm, for example, is formed on the entire top surface of the layered structure. Next, the insulating layer and the magnetic layer 16P are polished by CMP, for example, until the polishing stopper layer 15 is exposed. The top surfaces of the polishing stopper layer 15, the insulating layer, and the magnetic layer 16P are thereby flattened. If the polishing stopper layer 15, the insulating layer, and the magnetic layer 16P are polished by CMP, such a slurry is used that polishing is stopped when the polishing stopper layer 15 is exposed, such as an alumina-base slurry.

Figure 36:
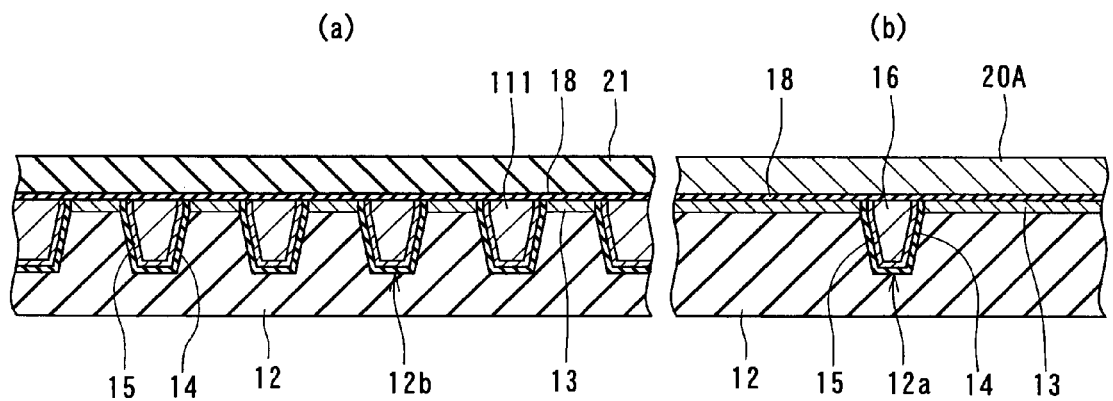
FIG. 36 is a cross-sectional view of the layered structure obtained in a step that follows the step shown in FIG. 35.

FIG. 36 illustrates the following step. FIG. 36 shows cross sections of the layered structure obtained in a step that follows the step illustrated in FIG. 35. FIG. 36(a) shows the cross section in the region in which the indicator section 110 is located. FIG. 36(b) shows the cross section in the region in which the pole layer 16 is located. In the step, first, ion beam etching, for example, is performed to remove portions of the polishing stopper layer 15 and the nonmagnetic film 14 that are located above the nonmagnetic conductive layer 13 and to etch a portion of the magnetic layer 16P. The top surfaces of the nonmagnetic conductive layer 13, the nonmagnetic film 14, the polishing stopper layer 15, and the magnetic layer 16P are thereby flattened. As a result, in the region where the indicator section 110 is to be located, the magnetic layer 16P is formed into the indicator layer 111, and, in the region where the pole layer 16 is to be located, the magnetic layer 16P is formed into the pole layer 16.

Next, the gap layer 18 is formed on the entire top surface of the layered structure. The method of forming the gap layer 18 is the same as that of the first embodiment. Next, the first layer 20A is formed on the gap layer 18, and the yoke layer 20B is formed on the pole layer 16. The method of forming the first layer 20A and the yoke layer 20B is the same as that of the first embodiment. Next, the nonmagnetic layer 21 is formed on the entire top surface of the layered structure. Next, the nonmagnetic layer 21 is polished by CMP, for example, so that the first layer 20A and the yoke layer 20B are exposed, and the top surfaces of the first layer 20A, the yoke layer 20B and the nonmagnetic layer 21 are flattened.

Figure 37:
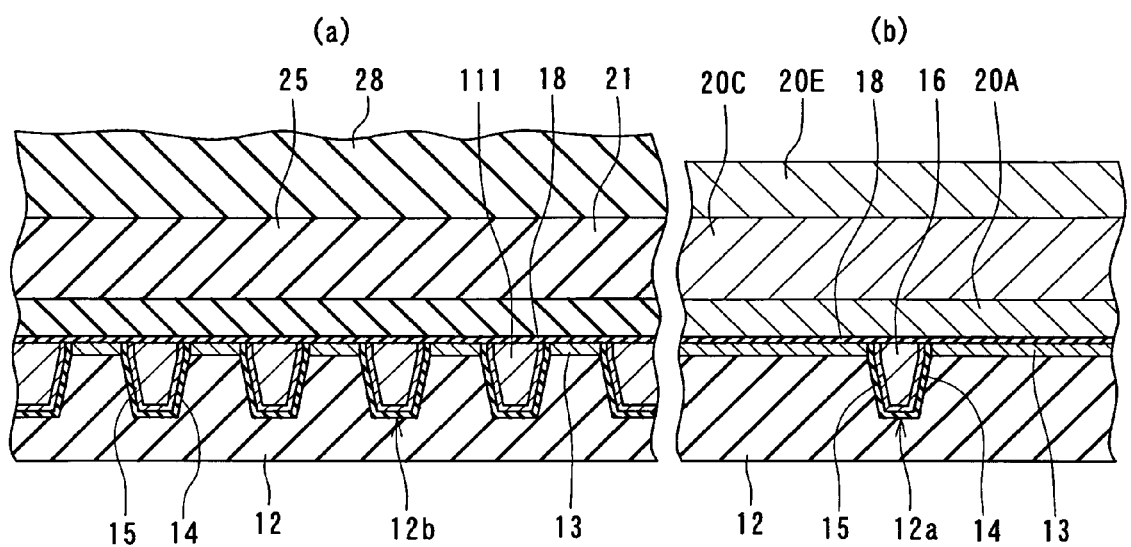
FIG. 37 is a cross-sectional view of the layered structure obtained in a step that follows the step shown in FIG. 36.
Figure 38:
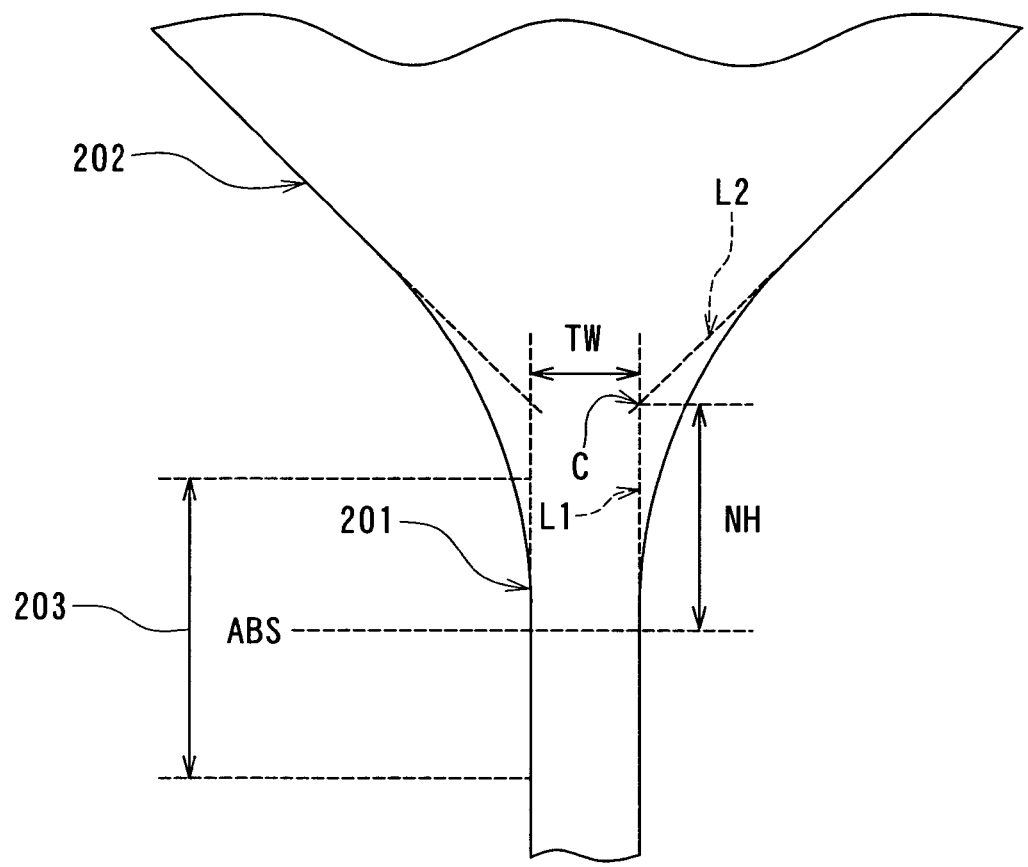
FIG. 38 is a view for illustrating an example of shape of the top surface of a pole layer of a magnetic head.

FIG. 37 illustrates the following step. FIG. 37 shows cross sections of the layered structure obtained in a step that follows the step illustrated in FIG. 36. FIG. 37(a) shows the cross section in the region in which the indicator section 110 is located. FIG. 37(b) shows the cross section in the region in which the pole layer 16 is located. In the step, first, the insulating layer 22 is formed on regions of the top surfaces of the yoke layer 20B and the nonmagnetic layer 21 in which the coil 23 will be disposed, as shown in FIG. 5. Next, the coil 23 is formed by frame plating, for example, such that at least part of the coil 23 is disposed on the insulating layer 22. Next, the second layer 20C and the coupling layer 20D are formed by frame plating, for example. Alternatively, the coil 23 may be formed after the second layer 20C and the coupling layer 20D are formed.

Next, the insulating layer 24 made of photoresist, for example, is selectively formed around the coil 23 and in the space between the respective adjacent turns of the coil 23. Next, the insulating layer 25 having a thickness of 4 to 4.5 µm, for example, is formed on the entire top surface of the layered structure. Next, the insulating layer 25 is polished by CMP, for example, so that the second layer 20C, the coupling layer 20D and the coil 23 are exposed, and the top surfaces of the second layer 20C, the coupling layer 20D, the coil 23 and the insulating layers 24 and 25 are thereby flattened.

Next, the insulating layer 26 is formed on the coil 23 and the insulating layer 24. Next, the third layer 20E is formed by frame plating, for example, to complete the shield layer 20. Next, the protection layer 28 is formed to cover the entire top surface of the layered structure. Wiring and terminals are then formed on the protection layer 28, the substrate is cut into sliders, and the steps including polishing of the medium facing surface 30 and fabrication of flying rails are performed. The magnetic head is thus completed.

The remainder of configuration, function and effect of the third embodiment are similar to those of the first embodiment. The indicator section 110 of the second embodiment may be formed by a method the same as that of the third embodiment.

The present invention is not limited to the foregoing embodiments but may be practiced in still other ways. For example, the shapes of the first and second indicators are not limited to the ones illustrated in the foregoing embodiments but may be any of such shapes that the widths of the first and second indicators are equal at the target location of the medium facing surface and that one of the widths of the first and second indicators decreases while the other increases with shifts in position along the direction orthogonal to the medium facing surface.

In any of the embodiments, a coil wound around the pole layer 16 in a helical manner may be provided in place of the flat-whorl-shaped coils 9 and 23.

The thin-film magnetic head described in the foregoing embodiments has a structure in which the read head is formed on the base body and the write head is stacked on the read head. Alternatively, the read head may be stacked on the write head.

The invention is applicable not only to magnetic heads for the perpendicular magnetic recording system but also to magnetic heads for the longitudinal magnetic recording system.

Obviously many modifications and variations of the present invention are possible in the light of the above teachings. It is therefore to be understood that within the scope of the appended claims the invention may be practiced otherwise than as specifically described.

What is claimed is:

1. A method of manufacturing magnetic heads, each of the magnetic heads comprising:
   a medium facing surface that faces toward a recording medium;
   a coil that generates a magnetic field corresponding to data to be written on the recording medium; and
   a pole layer that incorporates a track width defining portion having an end face located in the medium facing surface, allows a magnetic flux corresponding to the field generated by the coil to pass therethrough, and generates a write magnetic field for writing the data on the recording medium, the method comprising the steps of:
   fabricating a magnetic head substructure by forming a plurality of sets of the pole layer and the coil on a substrate so that a plurality of rows of pre-head portions that will be the respective magnetic heads later are aligned in the substructure; and
   fabricating the magnetic heads by separating the pre-head portions from one another through cutting the substructure, wherein:
   the step of fabricating the magnetic heads includes the step of forming the medium facing surfaces by polishing a surface formed by cutting the substructure;
   the step of fabricating the substructure includes the step of forming first and second indicators that are located in such regions that portions of the first and second indicators are exposed in the medium facing surfaces when the medium facing surfaces are formed, the first and second indicators indicating a target location of the medium facing surfaces that is a location at which the medium facing surfaces are to be formed; and
   widths of the first and second indicators are equal at the target location of the medium facing surfaces, and one of the widths of the first and second indicators decreases while the other increases with shifts in position along a direction orthogonal to the medium facing surfaces.

2. The method according to claim 1, wherein, in the substructure, a difference between the widths of the first and second indicators taken at a deviating position that deviates from the target location of the medium facing surfaces in the direction orthogonal to the medium facing surfaces is proportional to the amount of deviation of the deviating position from the target location of the medium facing surfaces.

3. The method according to claim 1, wherein:
   each of the magnetic heads further comprises a magnetoresistive element that has an end located in the medium facing surface and that reads data stored on the recording medium;
   a distance between the substrate and each of the first and second indicators is closer to a distance between the substrate and the track width defining portion than a distance between the substrate and the magnetoresistive element; and
   the magnetoresistive element is formed together with the pole layer and the coil in each of the pre-head portions in the step of fabricating the substructure.

4. The method according to claim 1, wherein, in each of the magnetic heads, the end face of the track width defining portion located in the medium facing surface has a width that decreases as a distance from the substrate decreases.

5. The method according to claim 1, wherein: the step of fabricating the substructure further includes the step of forming an encasing layer having grooves that accommodate the pole layers; and the pole layers are formed in the grooves of the encasing layer.

6. The method according to claim 5, wherein:
   the step of forming the encasing layer includes the steps of:
   forming a nonmagnetic layer that will be the encasing layer by forming the grooves therein later;
   forming a nonmagnetic conductive layer made of a nonmagnetic conductive material on a top surface of the nonmagnetic layer;
   patterning the nonmagnetic conductive layer so that penetrating openings are formed in the nonmagnetic conductive layer, each of the openings having a shape corresponding to a plane geometry of each of the pole layers; and
   forming the grooves in the nonmagnetic layer by selectively etching portions of the nonmagnetic layer exposed from the openings of the nonmagnetic conductive layer so that the nonmagnetic layer is formed into the encasing layer; and
   the step of forming the first and second indicators is performed at the same time as the step of patterning the nonmagnetic conductive layer, and the first and second indicators are formed of portions of the nonmagnetic conductive layer.

7. The method according to claim 5, wherein:
   the step of forming the encasing layer includes the steps of:
   forming a nonmagnetic layer that will be the encasing layer by forming the grooves therein later; and
   forming grooves that accommodate the pole layers and grooves that accommodate the first and second indicators in the nonmagnetic layer; and,
   in the step of fabricating the substructure, plating is performed to form the pole layers in the grooves that accommodate the pole layers and to form the first and second indicators in the grooves that accommodate the first and second indicators.

8. The method according to claim 1, wherein portions of the first and second indicators are located in regions that will remain in the magnetic heads.

9. The method according to claim 1, wherein the first and second indicators are located in regions that will not remain in the magnetic heads.

10. The method according to claim 1, wherein:
    the step of fabricating the substructure further includes the step of forming reference portions located in such regions that portions of the reference portions are exposed in the medium facing surfaces when the medium facing surfaces are formed; and
    each of the reference portions has a width that is equal to the width of each of the first and second indicators taken at the target location of the medium facing surfaces and that does not change with shifts in position along the direction orthogonal to the medium facing surface.

11. The method according to claim 1, wherein:
    the step of fabricating the substructure further includes the step of forming at least one pair of third and fourth indicators that are located in such regions that portions of the third and fourth indicators are exposed in the medium facing surfaces when the medium facing surfaces are formed, the third and fourth indicators indicating a position that deviates from the target location of the medium facing surfaces in the direction orthogonal to the medium facing surfaces; and widths of the third and fourth indicators are equal at the position that deviates from the target location of the medium facing surfaces, and one of the widths of the third and fourth indicators decreases while the other increases with shifts in position along the direction orthogonal to the medium facing surfaces.

12. The method according to claim 1, wherein:
the step of forming the first and second indicators includes the step of forming indicator defining portions that define outside shapes of the first and second indicators;
each of the first and second indicators has a side that intersects in a slanting direction an imaginary surface located at the target location of the medium facing surface; and
each of the indicator defining portions incorporates: a straight-line portion that defines the side of each of the first and second indicators; and a portion that is connected to an end of the straight-line portion and that intersects the imaginary surface at a right angle or at an angle closer to the right angle than does the straight-line portion.

13. The method according to claim 1, wherein: each of the first and second indicators has two sides corresponding to two sides of equal lengths of an isosceles triangle having a base located parallel to an imaginary surface located at the target location of the medium facing surface; and a smaller one of angles formed by each of the two sides of each of the first and second indicators with respect to the imaginary surface falls within a range of 10 to 63.4 degrees inclusive.

14. The method according to claim 1, wherein: each of the first and second indicators has two sides corresponding to two sides of equal lengths of an isosceles triangle having a base located parallel to an imaginary surface located at the target location of the medium facing surface; and, where a smaller one of angles formed by each of the two sides of each of the first and second indicators with respect to the imaginary surface is defined as $\theta$, the angle $\theta$ is of such a value that $2/\tan\theta$ is an integer.

15. The method according to claim 1, wherein the magnetic heads are those intended for use for a perpendicular magnetic recording system.

16. A magnetic head substructure used for manufacturing magnetic heads, each of the magnetic heads comprising:
a medium facing surface that faces toward a recording medium;
a coil that generates a magnetic field corresponding to data to be written on the recording medium; and
a pole layer that incorporates a track width defining portion having an end face located in the medium facing surface, allows a magnetic flux corresponding to the field generated by the coil to pass therethrough, and generates a write magnetic field for writing the data on the recording medium, the substructure comprising:
a substrate on which the pole layers and the coils are stacked;
a plurality of sets of the pole layer and the coil formed on the substrate so that a plurality of rows of pre-head portions that will be the respective magnetic heads later are aligned; and
first and second indicators that are located in such regions that portions of the first and second indicators are exposed in the medium facing surfaces when the medium facing surfaces are formed, the first and second indicators indicating a target location of the medium facing surfaces that is a location at which the medium facing surfaces are to be formed, wherein widths of the first and second indicators are equal at the target location of the medium facing surfaces, and one of the widths of the first and second indicators decreases while the other increases with shifts in position along a direction orthogonal to the medium facing surfaces.

17. The substructure according to claim 16, wherein, a difference between the widths of the first and second indicators taken at a deviating position that deviates from the target location of the medium facing surfaces in the direction orthogonal to the medium facing surfaces is proportional to the amount of deviation of the deviating position from the target location of the medium facing surfaces.

18. The substructure according to claim 16, wherein:
each of the magnetic heads further comprises a magnetoresistive element that has an end located in the medium facing surface and that reads data stored on the recording medium; and
a distance between the substrate and each of the first and second indicators is closer to a distance between the substrate and the track width defining portion than a distance between the substrate and the magnetoresistive element.

19. The substructure according to claim 16, wherein, in each of the magnetic heads, the end face of the track width defining portion located in the medium facing surface has a width that decreases as a distance from the substrate decreases.

20. The substructure according to claim 16, further comprising an encasing layer having grooves that accommodate the pole layers.

21. The substructure according to claim 20, further comprising a nonmagnetic conductive layer made of a nonmagnetic conductive material and disposed on a top surface of the encasing layer, wherein:
the nonmagnetic conductive layer has penetrating openings, and edges of the openings are located directly above edges of the grooves in the top surface of the encasing layer; and
the first and second indicators are formed of portions of the nonmagnetic conductive layer.

22. The substructure according to claim 20, wherein:
the encasing layer has grooves that accommodate the pole layers and grooves that accommodate the first and second indicators; and,
the first and second indicators are made of a material the same as a material of the pole layers.

23. The substructure according to claim 16, wherein portions of the first and second indicators are located in regions that will remain in the magnetic heads.

24. The substructure according to claim 16, wherein the first and second indicators are located in regions that will not remain in the magnetic heads.

25. The substructure according to claim 16, further comprising reference portions located in such regions that portions of the reference portions are exposed in the medium facing surfaces when the medium facing surfaces are formed, wherein
each of the reference portions has a width that is equal to the width of each of the first and second indicators taken at the target location of the medium facing surfaces and that does not change with shifts in position along the direction orthogonal to the medium facing surfaces.

26. The substructure according to claim 16, further comprising at least one pair of third and fourth indicators that are located in such regions that portions of the third and fourth indicators are exposed in the medium facing surfaces when the medium facing surfaces are formed, the third and fourth indicators indicating a position that deviates from the target location of the medium facing surfaces in the direction orthogonal to the medium facing surfaces, wherein widths of the third and fourth indicators are equal at the position that deviates from the target location of the medium facing surfaces, and one of the widths of the third and fourth indicators decreases while the other increases with shifts in position along the direction orthogonal to the medium facing surfaces.

27. The substructure according to claim 16, further comprising indicator defining portions that define outside shapes of the first and second indicators, wherein:

each of the first and second indicators has a side that intersects in a slanting direction an imaginary surface located at the target location of the medium facing surface; and each of the indicator defining portions incorporates: a straight-line portion that defines the side of each of the first and second indicators; and a portion that is connected to an end of the straight-line portion and that intersects the imaginary surface at a right angle or at an angle closer to the right angle than does the straight-line portion.

28. The substructure according to claim 16, wherein: each of the first and second indicators has two sides corresponding to two sides of equal lengths of an isosceles triangle having a base located parallel to an imaginary surface located at the target location of the medium facing surface; and a smaller one of angles formed by each of the two sides of each of the first and second indicators with respect to the imaginary surface falls within a range of 10 to 63.4 degrees inclusive.

29. The substructure according to claim 16, wherein: each of the first and second indicators has two sides corresponding to two sides of equal lengths of an isosceles triangle having a base located parallel to an imaginary surface located at the target location of the medium facing surface; and, where a smaller one of angles formed by each of the two sides of each of the first and second indicators with respect to the imaginary surface is defined as θ, the angle θ is of such a value that 2/tan θ is an integer.

30. The substructure according to claim 16, wherein the magnetic heads are those intended for use for a perpendicular magnetic recording system.

31. A magnetic head comprising:

a medium facing surface that faces toward a recording medium;

a coil that generates a magnetic field corresponding to data to be written on the recording medium;

a pole layer that incorporates a track width defining portion having an end face located in the medium facing surface, allows a magnetic flux corresponding to the field generated by the coil to pass therethrough, and generates a write magnetic field for writing the data on the recording medium;

a substrate on which the pole layers and the coils are stacked; and first and second indicators that are located in such regions that portions of the first and second indicators are exposed in the medium facing surface, the first and second indicators indicating a target location of the medium facing surface that is a location at which the medium facing surface is to be formed, wherein widths of the first and second indicators are equal at the target location of the medium facing surface, and one of the widths of the first and second indicators decreases while the other increases with shifts in position along a direction orthogonal to the medium facing surfaces.

32. The magnetic head according to claim 31, wherein a difference between the widths of the first and second indicators taken in the medium facing surface is proportional to an amount of deviation of the medium facing surface from the target location of the medium facing surface.

33. The magnetic head according to claim 31, further comprising a magnetoresistive element that has an end located in the medium facing surface and that reads data stored on the recording medium, wherein a distance between the substrate and each of the first and second indicators is closer to a distance between the substrate and the track width defining portion than a distance between the substrate and the magnetoresistive element.

34. The magnetic head according to claim 31, wherein the end face of the track width defining portion located in the medium facing surface has a width that decreases as a distance from the substrate decreases.

35. The magnetic head according to claim 31, further comprising an encasing layer having a groove that accommodates the pole layer.

36. The magnetic head according to claim 35, further comprising a nonmagnetic conductive layer made of a nonmagnetic conductive material and disposed on a top surface of the encasing layer, wherein:

the nonmagnetic conductive layer has a penetrating opening, and an edge of the opening is located directly above an edge of the groove in the top surface of the encasing layer; and the first and second indicators are formed of portions of the nonmagnetic conductive layer.

37. The magnetic head according to claim 35, wherein:

the encasing layer has a groove that accommodates the pole layer and grooves that accommodate the first and second indicators; and, the first and second indicators are made of a material the same as a material of the pole layer.

38. The magnetic head according to claim 31, further comprising a reference portion located in such a region that a portion of the reference portion is exposed in the medium facing surface, wherein the reference portion has a width that is equal to the width of each of the first and second indicators taken at the target location of the medium facing surface and that does not change with shifts in position along the direction orthogonal to the medium facing surface.

39. The magnetic head according to claim 31, further comprising at least one pair of third and fourth indicators that are located in such regions that portions of the third and fourth indicators are exposed in the medium facing surface, the third and fourth indicators indicating a position that deviates from the target location of the medium facing surface, wherein widths of the third and fourth indicators are equal at the position that deviates from the target location of the medium facing surface, and one of the widths of the third and fourth indicators decreases while the other increases with shifts in position along the direction orthogonal to the medium facing surfaces.

40. The magnetic head according to claim 31, further comprising an indicator defining portion that defines outside shapes of the first and second indicators, wherein:

each of the first and second indicators has a side that intersects in a slanting direction an imaginary surface located at the target location of the medium facing surface; and the indicator defining portion incorporates: a straight-line portion that defines the side of each of the first and second indicators; and a portion that is connected to an end of the straight-line portion and that intersects the imaginary surface at a right angle or at an angle closer to the right angle than does the straight-line portion.

41. The magnetic head according to claim 31, wherein: each of the first and second indicators has two sides corresponding to two sides of equal lengths of an isosceles triangle having a base located parallel to an imaginary surface located at the target location of the medium facing surface; and a smaller one of angles formed by each of the two sides of each of the first and second indicators with respect to the imaginary surface falls within a range of 10 to 63.4 degrees inclusive.

42. The magnetic head according to claim 31, wherein: each of the first and second indicators has two sides corresponding to two sides of equal lengths of an isosceles triangle having a base located parallel to an imaginary surface located at the target location of the medium facing surface; and, where a smaller one of angles formed by each of the two sides of each of the first and second indicators with respect to the imaginary surface is defined as θ, the angle θ is of such a value that 2/tan θ is an integer.

43. The magnetic head according to claim 31, which is intended for use for a perpendicular magnetic recording system.

* * * * *